(12) United States Patent
Kilper et al.

(10) Patent No.: US 7,251,071 B2
(45) Date of Patent: Jul. 31, 2007

(54) TRANSIENT CONTROL IN OPTICAL TRANSMISSION SYSTEMS

(75) Inventors: Daniel C. Kilper, Rumson, NJ (US); Claude A. Martell, Fair Haven, NJ (US); Narasimhan Raghavan, Piscataway, NJ (US); David A. Sadler, Holmdel, NJ (US); Christopher A. White, Neshanic Station, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 126 days.

(21) Appl. No.: 10/903,588

(22) Filed: Jul. 30, 2004

(65) Prior Publication Data
US 2006/0023297 A1 Feb. 2, 2006

(51) Int. Cl.
*H04B 10/08* (2006.01)
*H01S 3/00* (2006.01)
(52) U.S. Cl. .......................... 359/337; 398/25; 398/37
(58) Field of Classification Search ................ 359/337; 398/37, 25
See application file for complete search history.

(56) References Cited
U.S. PATENT DOCUMENTS

| | | | | |
|---|---|---|---|---|
| 5,680,247 A * | 10/1997 | Okuno | ................... | 359/337.12 |
| 6,356,386 B1 * | 3/2002 | Denkin et al. | ............... | 359/337 |
| 6,441,950 B1 * | 8/2002 | Chen et al. | ................... | 359/334 |
| 6,476,961 B1 * | 11/2002 | Ye et al. | ................. | 359/341.43 |
| 6,498,677 B1 * | 12/2002 | Sun et al. | ................. | 359/341.4 |
| 6,515,777 B1 * | 2/2003 | Arnold et al. | ................. | 398/97 |
| 6,535,330 B1 * | 3/2003 | Lelic et al. | ............. | 359/337.13 |
| 6,542,287 B1 * | 4/2003 | Ye et al. | ...................... | 359/334 |
| 6,621,621 B1 * | 9/2003 | Jones et al. | ............. | 359/337.11 |
| 6,633,430 B1 * | 10/2003 | Monnard et al. | ....... | 359/337.11 |
| 6,690,508 B2 * | 2/2004 | Tian et al. | ................ | 359/341.4 |
| 6,697,187 B2 * | 2/2004 | Seydnejad et al. | ........... | 359/334 |
| 2002/0109879 A1 * | 8/2002 | Wing So | ..................... | 359/118 |
| 2003/0081308 A1 | 5/2003 | So | .............................. | 359/337 |

OTHER PUBLICATIONS

Govind P. Agrawal. Fiber-Optic Communication Systems. 3rd Edition. 2002. pp. 7, 59, 226.*
Agrawal, Govind P. Fiber-Optic Communication Systems. 3rd Edition. Wiley-Interscience. 2002. p. 229.*

(Continued)

*Primary Examiner*—Deandra M. Hughes

(57) ABSTRACT

In an optical transmission system, operations of certain elements are adjusted in an individualized manner after detecting a change in the total optical power level corresponding to multiple optical channels in a link of the system in order to control transients in those channels. For example, in response to a sudden drop in the number of channels resulting from a fiber cut, the power levels of the optical pumps in a Raman amplifier in an OADM are adjusted to reduce transient gain errors in the surviving channels, where the adjustment to the pump power level for each different optical pump is a function of both the detected change in the total optical power level and at least one specified coefficient for that particular optical pump, in order to handle nonlinearities in the response of the Raman amplifier to the sudden drop in the number of optical channels.

35 Claims, 14 Drawing Sheets

OTHER PUBLICATIONS

"Gain Transient in Copumped and Counterpumped Raman Amplifiers", by L.L. Wang et al., IEEE Photonics Technology Letters, vol. 15, No. 5 May 2003, pp. 664-666.

"Suppression Method of Transiet Power Response of Raman Amplifier Cause by Channel Add-Drop", by Yasushi Sugaya et al., European Conference on Optical Communications, Sep. 8, 2002, 2 pages.

"Pump Interactions in a 100-nm Bandwidth Raman Amplifier", by Howard Kidorf et al., IEEE Photonics Technology Letters, vol. 11, No. 5 May 1999, pp. 530-532.

"Channel Addition/Removal Response in Raman Fiber Amplifiers: Modeling and Experimentation", by M. Karásek et al., Journal of Lightwave Technology, vol. 20, No. 9, Sep. 2002, pp. 1680-1687.

"Techniques for Suppression of Raman and EDFA Gain Transients in Dynamically Switched Transparent Photonic Networks", G. Goeger et al., Information and Communication Networks, Siemens AG, Munich, Germany, European Conference on Optical Communications, Sep. 8, 2002, 2 pages.

"Control of Transient Effects in Distributed and Lumped Raman Amplifiers", by C.J. Chen et al, Electronic Letters, Oct. 11, 2001, vol. 37, No. 21, pp. 1304-1305.

"A New Optimal Algorithm for Multipump Sources of Distributed Fiber Raman Amplifier", by Pengcheng Xiao et al., IEEE Photonics Technology Letters, vol. 15, No. 2, Feb. 2003, pp. 206-208.

"Fault Identification for Amplified WDM Optical Networks," by Y. Sun et al., 22nd European Conference on Optical Communication—ECOC'96, Oslo, vol. 1, Sep. 15, 1996, pp. 32-34, VP010303055.

"Transient Control Upgrades Amplifier Performance," by Atul Srivastava, Laser Focus World, Pennwell Pub., Tulsa, OK, US, Jul. 2001, pp. 89-90, XP009057320.

"Transient Control in RFAs For Multi-Pumping Environments By Using a Multi-Objective Optimization Approach," by Sidney Givigi Jr. et al., Optical Fiber Communication Conference, 2004., OFC 2004 Los Angeles, CA, USA Feb. 23-25, 2004, Piscataway, NJ, USA, IEEE, (Feb. 23, 2004), pp. 1-3, XP009057327.

* cited by examiner

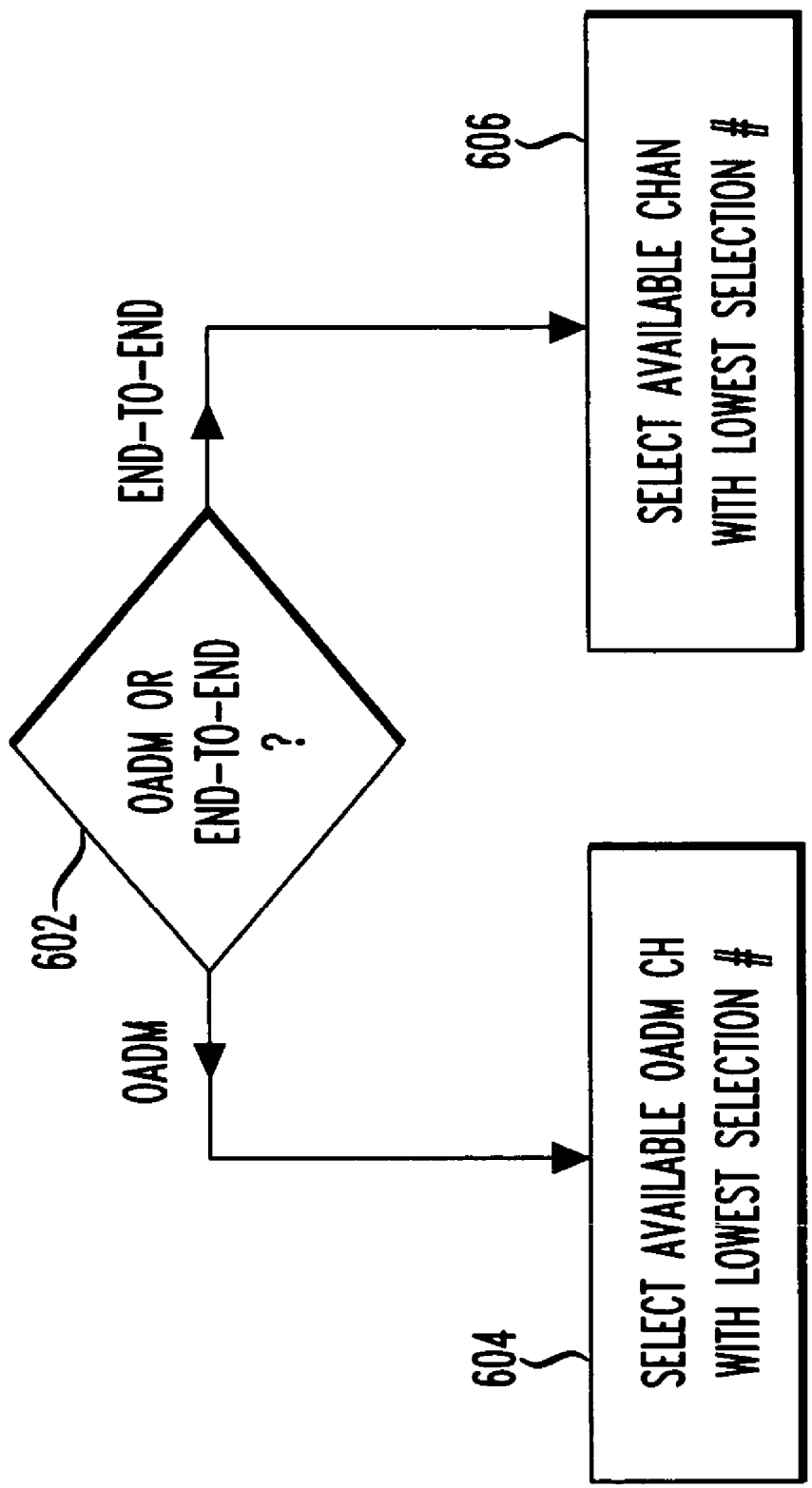

FIG. 7A

TABLE IV. CHANNEL-ASSIGNMENT LIST

| Channel | Set | Group | Offset | OADM Order | End-To-End Order |
|---|---|---|---|---|---|
| Ch1 | Start-up | 1 | 0 | 5 | 25 |
| Ch2 | Start-up | 1 | 50 | | 75 |
| Ch3 | Start-up | 1 | 100 | 30 | 50 |
| Ch4 | Start-up | 1 | 150 | | 100 |
| Ch5 | Start-up | 1 | 0 | 20 | 10 |
| Ch6 | Start-up | 1 | 50 | | 60 |
| Ch7 | Start-up | 1 | 100 | 45 | 35 |
| Ch8 | Start-up | 1 | 150 | | 85 |
| Ch9 | Start-up | 1 | 0 | 10 | 20 |
| Ch10 | Start-up | 1 | 50 | | 70 |
| Ch11 | Start-up | 1 | 100 | 35 | 45 |
| Ch12 | Start-up | 1 | 150 | | 95 |
| Ch13 | Start-up | 1 | 0 | 25 | 5 |
| Ch14 | Start-up | 1 | 50 | | 55 |
| Ch15 | Start-up | 1 | 100 | 50 | 30 |
| Ch16 | Start-up | 1 | 150 | | 80 |
| Ch17 | Start-up | 1 | 0 | 15 | 15 |
| Ch18 | Start-up | 1 | 50 | | 65 |
| Ch19 | Start-up | 1 | 100 | 40 | 40 |
| Ch20 | Start-up | 1 | 150 | | 90 |
| Ch21 | Start-up | 2 | 0 | 3 | 23 |
| Ch22 | Start-up | 2 | 50 | | 73 |
| Ch23 | Start-up | 2 | 100 | 28 | 48 |
| Ch24 | Start-up | 2 | 150 | | 98 |
| Ch25 | Start-up | 2 | 0 | 18 | 8 |
| Ch26 | Start-up | 2 | 50 | | 58 |
| Ch27 | Start-up | 2 | 100 | 43 | 33 |
| Ch28 | Start-up | 2 | 150 | | 88 |
| Ch29 | Start-up | 2 | 0 | 8 | 18 |
| Ch30 | Start-up | 2 | 50 | | 68 |
| Ch31 | Start-up | 2 | 100 | 33 | 43 |
| Ch32 | Start-up | 2 | 150 | | 93 |
| Ch33 | Start-up | 2 | 0 | 23 | 3 |
| Ch34 | Start-up | 2 | 50 | | 53 |
| Ch35 | Start-up | 2 | 100 | 48 | 28 |
| Ch36 | Start-up | 2 | 150 | | 78 |
| Ch37 | Start-up | 2 | 0 | 13 | 13 |
| Ch38 | Start-up | 2 | 50 | | 63 |
| Ch39 | Start-up | 2 | 100 | 38 | 38 |
| Ch40 | Start-up | 2 | 150 | | 88 |

FIG. 7B

TABLE IV. CHANNEL-ASSIGNMENT LIST

| Channel | Set | Group | Offset | OADM Order | End-To-End Order |
|---|---|---|---|---|---|
| Ch41 | Start-up | 3 | 0 | 1 | 21 |
| Ch42 | Start-up | 3 | 50 |  | 71 |
| Ch43 | Start-up | 3 | 100 | 26 | 46 |
| Ch44 | Start-up | 3 | 150 |  | 96 |
| Ch45 | Start-up | 3 | 0 | 16 | 6 |
| Ch46 | Start-up | 3 | 50 |  | 56 |
| Ch47 | Start-up | 3 | 100 | 41 | 31 |
| Ch48 | Start-up | 3 | 150 |  | 81 |
| Ch49 | Start-up | 3 | 0 | 6 | 16 |
| Ch50 | Start-up | 3 | 50 |  | 66 |
| Ch51 | Start-up | 3 | 100 | 31 | 41 |
| Ch52 | Start-up | 3 | 150 |  | 91 |
| Ch53 | Start-up | 3 | 0 | 21 | 1 |
| Ch54 | Start-up | 3 | 50 |  | 51 |
| Ch55 | Start-up | 3 | 100 | 46 | 26 |
| Ch56 | Start-up | 3 | 150 |  | 76 |
| Ch57 | Start-up | 3 | 0 | 11 | 11 |
| Ch58 | Start-up | 3 | 50 |  | 61 |
| Ch59 | Start-up | 3 | 100 | 36 | 36 |
| Ch60 | Start-up | 3 | 150 |  | 86 |
| Ch61 | Start-up | 4 | 0 | 2 | 22 |
| Ch62 | Start-up | 4 | 50 |  | 72 |
| Ch63 | Start-up | 4 | 100 | 27 | 47 |
| Ch64 | Start-up | 4 | 150 |  | 97 |
| Ch65 | Start-up | 4 | 0 | 17 | 7 |
| Ch66 | Start-up | 4 | 50 |  | 57 |
| Ch67 | Start-up | 4 | 100 | 42 | 32 |
| Ch68 | Start-up | 4 | 150 |  | 82 |
| Ch69 | Start-up | 4 | 0 | 7 | 17 |
| Ch70 | Start-up | 4 | 50 |  | 67 |
| Ch71 | Start-up | 4 | 100 | 32 | 42 |
| Ch72 | Start-up | 4 | 150 |  | 92 |
| Ch73 | Start-up | 4 | 0 | 22 | 2 |
| Ch74 | Start-up | 4 | 50 |  | 52 |
| Ch75 | Start-up | 4 | 100 | 47 | 27 |
| Ch76 | Start-up | 4 | 150 |  | 77 |
| Ch77 | Start-up | 4 | 0 | 12 | 12 |
| Ch78 | Start-up | 4 | 50 |  | 62 |
| Ch79 | Start-up | 4 | 100 | 37 | 37 |
| Ch80 | Start-up | 4 | 150 |  | 87 |

FIG. 7C

TABLE IV. CHANNEL-ASSIGNMENT LIST

| Channel | Set | Group | Offset | OADM Order | End-To-End Order |
|---|---|---|---|---|---|
| Ch81 | Start-up | 5 | 0 | 4 | 24 |
| Ch82 | Start-up | 5 | 50 |  | 74 |
| Ch83 | Start-up | 5 | 100 | 29 | 49 |
| Ch84 | Start-up | 5 | 150 |  | 99 |
| Ch85 | Start-up | 5 | 0 | 19 | 9 |
| Ch86 | Start-up | 5 | 50 |  | 59 |
| Ch87 | Start-up | 5 | 100 | 44 | 34 |
| Ch88 | Start-up | 5 | 150 |  | 84 |
| Ch89 | Start-up | 5 | 0 | 9 | 19 |
| Ch90 | Start-up | 5 | 50 |  | 69 |
| Ch91 | Start-up | 5 | 100 | 34 | 44 |
| Ch92 | Start-up | 5 | 150 |  | 94 |
| Ch93 | Start-up | 5 | 0 | 24 | 4 |
| Ch94 | Start-up | 5 | 50 |  | 54 |
| Ch95 | Start-up | 5 | 100 | 49 | 29 |
| Ch96 | Start-up | 5 | 150 |  | 79 |
| Ch97 | Start-up | 5 | 0 | 14 | 14 |
| Ch98 | Start-up | 5 | 50 |  | 64 |
| Ch99 | Start-up | 5 | 100 | 39 | 39 |
| Ch100 | Start-up | 5 | 150 |  | 89 |
| Ch101 | Growth | 6 | 0 | 51 | 121 |
| Ch102 | Growth | 6 | 50 |  | 171 |
| Ch103 | Growth | 6 | 100 | 76 | 146 |
| Ch104 | Growth | 6 | 150 |  | 196 |
| Ch105 | Growth | 6 | 0 | 56 | 116 |
| Ch106 | Growth | 6 | 50 |  | 166 |
| Ch107 | Growth | 6 | 100 | 81 | 141 |
| Ch108 | Growth | 6 | 150 |  | 191 |
| Ch109 | Growth | 6 | 0 | 61 | 111 |
| Ch110 | Growth | 6 | 50 |  | 161 |
| Ch111 | Growth | 6 | 100 | 86 | 136 |
| Ch112 | Growth | 6 | 150 |  | 186 |
| Ch113 | Growth | 6 | 0 | 66 | 106 |
| Ch114 | Growth | 6 | 50 |  | 156 |
| Ch115 | Growth | 6 | 100 | 91 | 131 |
| Ch116 | Growth | 6 | 150 |  | 181 |
| Ch117 | Growth | 6 | 0 | 71 | 101 |
| Ch118 | Growth | 6 | 50 |  | 151 |
| Ch119 | Growth | 6 | 100 | 96 | 126 |
| Ch120 | Growth | 6 | 150 |  | 176 |

FIG. 7D

TABLE IV. CHANNEL-ASSIGNMENT LIST

| Channel | Set | Group | Offset | OADM Order | End-To-End Order |
|---|---|---|---|---|---|
| Ch121 | Growth | 7 | 0 | 52 | 122 |
| Ch122 | Growth | 7 | 50 |  | 172 |
| Ch123 | Growth | 7 | 100 | 77 | 147 |
| Ch124 | Growth | 7 | 150 |  | 197 |
| Ch125 | Growth | 7 | 0 | 57 | 117 |
| Ch126 | Growth | 7 | 50 |  | 167 |
| Ch127 | Growth | 7 | 100 | 82 | 142 |
| Ch128 | Growth | 7 | 150 |  | 192 |
| Ch129 | Growth | 7 | 0 | 62 | 112 |
| Ch130 | Growth | 7 | 50 |  | 162 |
| Ch131 | Growth | 7 | 100 | 87 | 137 |
| Ch132 | Growth | 7 | 150 |  | 187 |
| Ch133 | Growth | 7 | 0 | 67 | 107 |
| Ch134 | Growth | 7 | 50 |  | 157 |
| Ch135 | Growth | 7 | 100 | 92 | 132 |
| Ch136 | Growth | 7 | 150 |  | 182 |
| Ch137 | Growth | 7 | 0 | 72 | 102 |
| Ch138 | Growth | 7 | 50 |  | 152 |
| Ch139 | Growth | 7 | 100 | 97 | 127 |
| Ch140 | Growth | 7 | 150 |  | 177 |
| Ch141 | Growth | 8 | 0 | 53 | 123 |
| Ch142 | Growth | 8 | 50 |  | 173 |
| Ch143 | Growth | 8 | 100 | 78 | 148 |
| Ch144 | Growth | 8 | 150 |  | 198 |
| Ch145 | Growth | 8 | 0 | 58 | 118 |
| Ch146 | Growth | 8 | 50 |  | 168 |
| Ch147 | Growth | 8 | 100 | 83 | 143 |
| Ch148 | Growth | 8 | 150 |  | 193 |
| Ch149 | Growth | 8 | 0 | 63 | 113 |
| Ch150 | Growth | 8 | 50 |  | 163 |
| Ch151 | Growth | 8 | 100 | 88 | 138 |
| Ch152 | Growth | 8 | 150 |  | 188 |
| Ch153 | Growth | 8 | 0 | 68 | 108 |
| Ch154 | Growth | 8 | 50 |  | 158 |
| Ch155 | Growth | 8 | 100 | 93 | 133 |
| Ch156 | Growth | 8 | 150 |  | 183 |
| Ch157 | Growth | 8 | 0 | 73 | 103 |
| Ch158 | Growth | 8 | 50 |  | 153 |
| Ch159 | Growth | 8 | 100 | 98 | 128 |
| Ch160 | Growth | 8 | 150 |  | 178 |

FIG. 7E

TABLE IV. CHANNEL-ASSIGNMENT LIST

| Channel | Set | Group | Offset | OADM Order | End-To-End Order |
|---|---|---|---|---|---|
| Ch161 | Growth | 9 | 0 | 54 | 124 |
| Ch162 | Growth | 9 | 50 | | 174 |
| Ch163 | Growth | 9 | 100 | 79 | 149 |
| Ch164 | Growth | 9 | 150 | | 199 |
| Ch165 | Growth | 9 | 0 | 59 | 119 |
| Ch166 | Growth | 9 | 50 | | 169 |
| Ch167 | Growth | 9 | 100 | 84 | 144 |
| Ch168 | Growth | 9 | 150 | | 194 |
| Ch169 | Growth | 9 | 0 | 64 | 114 |
| Ch170 | Growth | 9 | 50 | | 164 |
| Ch171 | Growth | 9 | 100 | 89 | 139 |
| Ch172 | Growth | 9 | 150 | | 189 |
| Ch173 | Growth | 9 | 0 | 69 | 109 |
| Ch174 | Growth | 9 | 50 | | 159 |
| Ch175 | Growth | 9 | 100 | 94 | 134 |
| Ch176 | Growth | 9 | 150 | | 184 |
| Ch177 | Growth | 9 | 0 | 74 | 104 |
| Ch178 | Growth | 9 | 50 | | 154 |
| Ch179 | Growth | 9 | 100 | 99 | 129 |
| Ch180 | Growth | 9 | 150 | | 179 |
| Ch181 | Growth | 10 | 0 | 55 | 125 |
| Ch182 | Growth | 10 | 50 | | 175 |
| Ch183 | Growth | 10 | 100 | 80 | 150 |
| Ch184 | Growth | 10 | 150 | | 200 |
| Ch185 | Growth | 10 | 0 | 60 | 120 |
| Ch186 | Growth | 10 | 50 | | 170 |
| Ch187 | Growth | 10 | 100 | 85 | 145 |
| Ch188 | Growth | 10 | 150 | | 195 |
| Ch189 | Growth | 10 | 0 | 65 | 115 |
| Ch190 | Growth | 10 | 50 | | 165 |
| Ch191 | Growth | 10 | 100 | 90 | 140 |
| Ch192 | Growth | 10 | 150 | | 190 |
| Ch193 | Growth | 10 | 0 | 70 | 110 |
| Ch194 | Growth | 10 | 50 | | 160 |
| Ch195 | Growth | 10 | 100 | 95 | 135 |
| Ch196 | Growth | 10 | 150 | | 185 |
| Ch197 | Growth | 10 | 0 | 75 | 105 |
| Ch198 | Growth | 10 | 50 | | 155 |
| Ch199 | Growth | 10 | 100 | 100 | 130 |
| Ch200 | Growth | 10 | 150 | | 180 |

FIG. 8A

TABLE V. CHANNEL CONFIGURATION

| Channel | Set | Group | Offset | OADM Order | End-To-End Order |
|---|---|---|---|---|---|
| Ch1 | Start-up | 1 | 0 | 5 | |
| Ch2 | Start-up | 1 | 50 | | |
| Ch3 | Start-up | 1 | 100 | | |
| Ch4 | Start-up | 1 | 150 | | |
| Ch5 | Start-up | 1 | 0 | | 10 |
| Ch6 | Start-up | 1 | 50 | | |
| Ch7 | Start-up | 1 | 100 | | |
| Ch8 | Start-up | 1 | 150 | | |
| Ch9 | Start-up | 1 | 0 | 10 | |
| Ch10 | Start-up | 1 | 50 | | |
| Ch11 | Start-up | 1 | 100 | | |
| Ch12 | Start-up | 1 | 150 | | |
| Ch13 | Start-up | 1 | 0 | | 5 |
| Ch14 | Start-up | 1 | 50 | | |
| Ch15 | Start-up | 1 | 100 | | |
| Ch16 | Start-up | 1 | 150 | | |
| Ch17 | Start-up | 1 | 0 | | |
| Ch18 | Start-up | 1 | 50 | | |
| Ch19 | Start-up | 1 | 100 | | |
| Ch20 | Start-up | 1 | 150 | | |
| Ch21 | Start-up | 2 | 0 | 3 | |
| Ch22 | Start-up | 2 | 50 | | |
| Ch23 | Start-up | 2 | 100 | | |
| Ch24 | Start-up | 2 | 150 | | |
| Ch25 | Start-up | 2 | 0 | | 8 |
| Ch26 | Start-up | 2 | 50 | | |
| Ch27 | Start-up | 2 | 100 | | |
| Ch28 | Start-up | 2 | 150 | | |
| Ch29 | Start-up | 2 | 0 | 8 | |
| Ch30 | Start-up | 2 | 50 | | |
| Ch31 | Start-up | 2 | 100 | | |
| Ch32 | Start-up | 2 | 150 | | |
| Ch33 | Start-up | 2 | 0 | | 3 |
| Ch34 | Start-up | 2 | 50 | | |
| Ch35 | Start-up | 2 | 100 | | |
| Ch36 | Start-up | 2 | 150 | | |
| Ch37 | Start-up | 2 | 0 | | |
| Ch38 | Start-up | 2 | 50 | | |
| Ch39 | Start-up | 2 | 100 | | |
| Ch40 | Start-up | 2 | 150 | | |

FIG. 8B

TABLE V. CHANNEL CONFIGURATION

| Channel | Set | Group | Offset | OADM Order | End-To-End Order |
|---|---|---|---|---|---|
| Ch41 | Start-up | 3 | 0 | 1 | |
| Ch42 | Start-up | 3 | 50 | | |
| Ch43 | Start-up | 3 | 100 | | |
| Ch44 | Start-up | 3 | 150 | | |
| Ch45 | Start-up | 3 | 0 | | 6 |
| Ch46 | Start-up | 3 | 50 | | |
| Ch47 | Start-up | 3 | 100 | | |
| Ch48 | Start-up | 3 | 150 | | |
| Ch49 | Start-up | 3 | 0 | 6 | |
| Ch50 | Start-up | 3 | 50 | | |
| Ch51 | Start-up | 3 | 100 | | |
| Ch52 | Start-up | 3 | 150 | | |
| Ch53 | Start-up | 3 | 0 | | 1 |
| Ch54 | Start-up | 3 | 50 | | |
| Ch55 | Start-up | 3 | 100 | | |
| Ch56 | Start-up | 3 | 150 | | |
| Ch57 | Start-up | 3 | 0 | | |
| Ch58 | Start-up | 3 | 50 | | |
| Ch59 | Start-up | 3 | 100 | | |
| Ch60 | Start-up | 3 | 150 | | |
| Ch61 | Start-up | 4 | 0 | 2 | |
| Ch62 | Start-up | 4 | 50 | | |
| Ch63 | Start-up | 4 | 100 | | |
| Ch64 | Start-up | 4 | 150 | | |
| Ch65 | Start-up | 4 | 0 | | 7 |
| Ch66 | Start-up | 4 | 50 | | |
| Ch67 | Start-up | 4 | 100 | | |
| Ch68 | Start-up | 4 | 150 | | |
| Ch69 | Start-up | 4 | 0 | 7 | |
| Ch70 | Start-up | 4 | 50 | | |
| Ch71 | Start-up | 4 | 100 | | |
| Ch72 | Start-up | 4 | 150 | | |
| Ch73 | Start-up | 4 | 0 | | 2 |
| Ch74 | Start-up | 4 | 50 | | |
| Ch75 | Start-up | 4 | 100 | | |
| Ch76 | Start-up | 4 | 150 | | |
| Ch77 | Start-up | 4 | 0 | | |
| Ch78 | Start-up | 4 | 50 | | |
| Ch79 | Start-up | 4 | 100 | | |
| Ch80 | Start-up | 4 | 150 | | |

FIG. 8C

TABLE V. CHANNEL CONFIGURATION

| Channel | Set | Group | Offset | OADM Order | End-To-End Order |
|---|---|---|---|---|---|
| Ch81 | Start-up | 5 | 0 | 4 | |
| Ch82 | Start-up | 5 | 50 | | |
| Ch83 | Start-up | 5 | 100 | | |
| Ch84 | Start-up | 5 | 150 | | |
| Ch85 | Start-up | 5 | 0 | | 9 |
| Ch86 | Start-up | 5 | 50 | | |
| Ch87 | Start-up | 5 | 100 | | |
| Ch88 | Start-up | 5 | 150 | | |
| Ch89 | Start-up | 5 | 0 | 9 | |
| Ch90 | Start-up | 5 | 50 | | |
| Ch91 | Start-up | 5 | 100 | | |
| Ch92 | Start-up | 5 | 150 | | |
| Ch93 | Start-up | 5 | 0 | | 4 |
| Ch94 | Start-up | 5 | 50 | | |
| Ch95 | Start-up | 5 | 100 | | |
| Ch96 | Start-up | 5 | 150 | | |
| Ch97 | Start-up | 5 | 0 | | |
| Ch98 | Start-up | 5 | 50 | | |
| Ch99 | Start-up | 5 | 100 | | |
| Ch100 | Start-up | 5 | 150 | | |
| Ch101 | Growth | 6 | 0 | | |
| Ch102 | Growth | 6 | 50 | | |
| Ch103 | Growth | 6 | 100 | | |
| Ch104 | Growth | 6 | 150 | | |
| Ch105 | Growth | 6 | 0 | | |
| Ch106 | Growth | 6 | 50 | | |
| Ch107 | Growth | 6 | 100 | | |
| Ch108 | Growth | 6 | 150 | | |
| Ch109 | Growth | 6 | 0 | | |
| Ch110 | Growth | 6 | 50 | | |
| Ch111 | Growth | 6 | 100 | | |
| Ch112 | Growth | 6 | 150 | | |
| Ch113 | Growth | 6 | 0 | | |
| Ch114 | Growth | 6 | 50 | | |
| Ch115 | Growth | 6 | 100 | | |
| Ch116 | Growth | 6 | 150 | | |
| Ch117 | Growth | 6 | 0 | | |
| Ch118 | Growth | 6 | 50 | | |
| Ch119 | Growth | 6 | 100 | | |
| Ch120 | Growth | 6 | 150 | | |

TRANSIENT CONTROL IN OPTICAL TRANSMISSION SYSTEMS

CROSS-REFERENCE TO RELATED APPLICATIONS

This application is one of a set of two U.S. patent applications consisting of Ser. No. 10/903,588 and Ser. No. 10/903,872 both of which were filed on the same date and the teachings of both which are incorporated herein by reference.

BACKGROUND OF THE INVENTION

1. Field of the Invention

The invention relates to optical transmission systems, and, in particular, to techniques for responding to failures in such systems.

2. Description of the Related Art

Broadband Raman optical amplifiers are often used in long-reach, wavelength-division multiplexing (WDM) transmission systems. When transparent networking elements such as optical add-drop multiplexers (OADMs) and optical cross-connects (OXCs) are used in such systems, the amplifier power transients resulting from network failures can result in significant power excursions on WDM channels that survive the network failure. These excursions are caused by gain saturation and pump depletion in the optical amplifiers. The desired amplifier gain settings and pump power levels for the surviving channels will change depending on the number of WDM channels being amplified and their configuration within the WDM spectrum. Transient spiking and residual gain errors may occur unless the optical amplifiers are controlled to respond sufficiently to such events.

For broadband Raman amplifiers, multiple pumps supply power at different wavelengths, where WDM channels at different wavelengths can receive different amplification depending on the various pump power settings. Setting the correct pump powers in order to achieve a target gain for each WDM channel is a complex operation that is usually accomplished by measuring the power levels of one or more channels and adjusting one or more pump powers so that the channel powers approach the target levels. These measurements and pump adjustments are often performed many times in order to get a set of channels to match their target power levels. During normal system operation, these measurements and adjustments happen at a relatively slow rate (e.g., typically seconds to minutes).

The control response of an amplifier to a transient event should be fast enough to sufficiently suppress power excursions in surviving WDM channels. The conventional Raman amplifier adjustment procedure mentioned above will typically be too slow to respond to many common network failures such as fiber breaks.

SUMMARY OF THE INVENTION

One possible technique for suppressing transients resulting from fiber breaks and other network failures is to adjust all of the pumps of an affected Raman amplifier based on a ratio derived from the change in total optical power, e.g., across the entire WDM bandwidth as measured at either the input or the output of the amplifier. Using a total power measurement has the advantages of being relatively fast and inexpensive. However, since several nonlinear effects are present within the Raman amplifier, a uniform adjustment to all of the Raman pumps will often result in unacceptably large channel-dependent gain errors. It is possible to obtain the correct total power gain, yet have undesirably large errors in the individual channel gains.

Another possible transient-control technique minimizes the different channel gain errors by determining individualized adjustments for each Raman pump. Rather than simply adjusting all pumps using a single ratio, each pump is uniquely adjusted, such that both the total gain error and individual gain errors resulting from an amplifier transient are minimized for the surviving WDM channels. In one implementation, different ratios may be selected for the different pumps based on a fixed set of coefficients that optimally configures the pumps for as wide a range of surviving-channel configurations as possible. This can dramatically increase the number of surviving-channel configurations having satisfactory transient control.

It should be noted that, for a given surviving-channel configuration, there is an ideal set of pump ratios that exhibits minimal gain error. However, determination of this set of ratios would require full knowledge of the output channel spectrum. Thus, a hierarchy of methods for selecting these ratios exists, beginning with only total power change and including increasingly more information concerning the channel powers and channel configurations.

These transient-control techniques that implement individualized pump adjustments can be further improved by introducing a channel-growth plan that is optimized for transient control, where the transient-control technique can be tuned to provide optimized performance for the limited range of surviving-channel configurations that will likely occur in the system under the applied channel-growth plan.

Due to typical limitations on the system information available to mitigate transients, transient-control techniques may make several assumptions about the post-transient channel loading. For this reason, some channel configurations that do not satisfy these assumptions will have a poor transient response in terms of the magnitude of impairment on the surviving channels. By introducing a channel-growth plan based upon transient-suppression performance, the transient-induced performance degradation experienced by the surviving channels can be dramatically reduced. A transient-based channel-growth plan can be constructed with good systems design to overlap with lowest-cost and/or best steady-state performance growth plans. Furthermore, by constraining the possible configurations of surviving channels, transient control can be simplified, which leads to both better performance and lower cost.

BRIEF DESCRIPTION OF THE DRAWINGS

Other aspects, features, and advantages of the invention will become more fully apparent from the following detailed description, the appended claims, and the accompanying drawings in which like reference numerals identify similar or identical elements.

FIG. 6 shows a flow diagram of the processing implemented to select a channel for the next provisioned service in the exemplary transmission system of FIG. 4;

FIGS. 7A-E show Table IV, which shows a possible channel-assignment list generated based on an exemplary transient-based channel-growth plan; and FIGS. 8A-C show Table V, which shows the channel configuration resulting from provisioning 10 OADM channels followed by 10 end-to-end channels using the channel-assignment list of Table IV.

DETAILED DESCRIPTION

Transient Control

Figure 1:
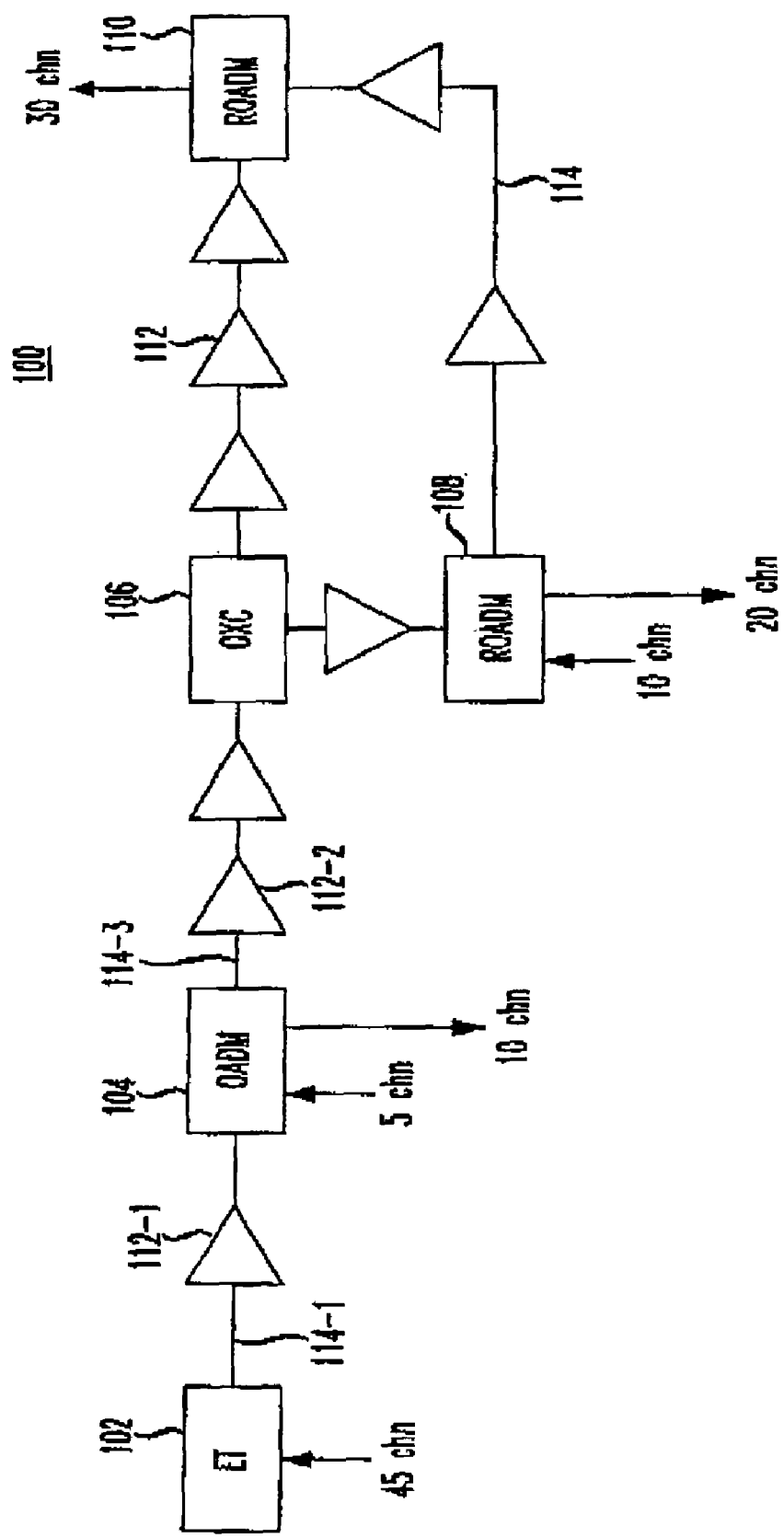
FIG. 1 shows a block diagram of a portion of an exemplary optical communications system used to illustrate some of the different types of elements for which transient control may be implemented.

FIG. 1 shows a block diagram of a portion of an exemplary optical communications system 100 used to illustrate some of the different types of elements for which transient control may be implemented. In particular, FIG. 1 shows a portion of system 100 having five different types of elements (i.e., end terminal (ET) 102, optical add/drop multiplexer (OADM) 104, optical cross-connect (OXC) 106, reconfigurable OADMs (ROADMs) 108 and 110, and eight repeaters 112) interconnected by 14 optical fibers 114.

In general, an end terminal can add and drop WDM channels, while an OADM can add/drop channels will passing through other channels. An OXC can switch channels to different paths. In addition to being able to add/drop channels, a ROADM can also switch channels to different paths. ROADMs are typically more flexible that OADMs in that ROADMs may be able to add/drop (or pass through) any channel, while OADMs may be able to add/drop only a limited set of channels. In addition, ROADMs may be able to change the wavelengths of signals that are passed through, such that a particular signal's input channel is different from the signal's output channel. Repeaters pass through and re-condition channels, primarily using amplification.

In FIG. 1, optical signals are represented as flowing generally from left to right (i.e., in the direction from ET 102 towards ROADM 110). In particular, 45 WDM channels are added at ET 102 and transmitted towards OADM 104. OADM 104 drops ten of those 45 channels and adds five channels for transmission towards OXC 106. Note that some, all, or none of those five channels added at OADM 104 may have the same wavelengths as channels dropped at OADM 104.

Of the 40 channels transmitted from OADM 104 towards OXC 106, at least 20 channels are routed towards ROADM 108, with the remainder being routed towards ROADM 110. ROADM 108 drops 20 of the channels received from OXC 106 and adds 10 channels to however many channels are passed through for transmission on to ROADM 110. ROADM XV combines the channels received from OXC 106 and ROADM 108 to forward a total of 30 channels on to other portions (not shown) of the system.

Although FIG. 1 represents uni-directional signals flowing generally from left to right, in general, such portions of optical communications systems would also have uni-directional signals flowing generally from right to left (i.e., in the direction from ROADM 110 towards ET 102). Depending on the particular implementation, the resulting bi-directional signals may be transmitted separately over different uni-directional fibers or together over bi-directional fibers.

In order to operate effectively over large geographical regions with long lengths of optical fibers interconnecting the various nodes, optical transmission systems, such as system 100 of FIG. 1, rely on optical signal amplification to ensure that signals of adequate signal-to-noise ratio (SNR) reach their desired destinations. One typical mechanism for optical signal amplification is based on Raman amplification, in which optical signals of various wavelengths are added at one end of an optical fiber, such that, as the Raman signals and the WDM signals propagate within an optical fiber, power from the Raman signals is transferred to the WDM signals, thereby increasing the strength of the WDM signals. In certain system implementations, each repeater and each different node is implemented with one or more Raman amplifiers.

In general, there are two different types of Raman amplification: forward-pumped and backward-pumped. In forward-pumped Raman amplification, the Raman signals propagate along the optical fiber with the WDM signals, i.e., in the same direction as the WDM signals, while, in backward-pumped Raman amplification, the Raman signals counter-propagate, i.e., in the opposite direction from the WDM signals. Typically, the frequencies of the Raman pump signals are outside of the WDM channel band.

Figure 2:
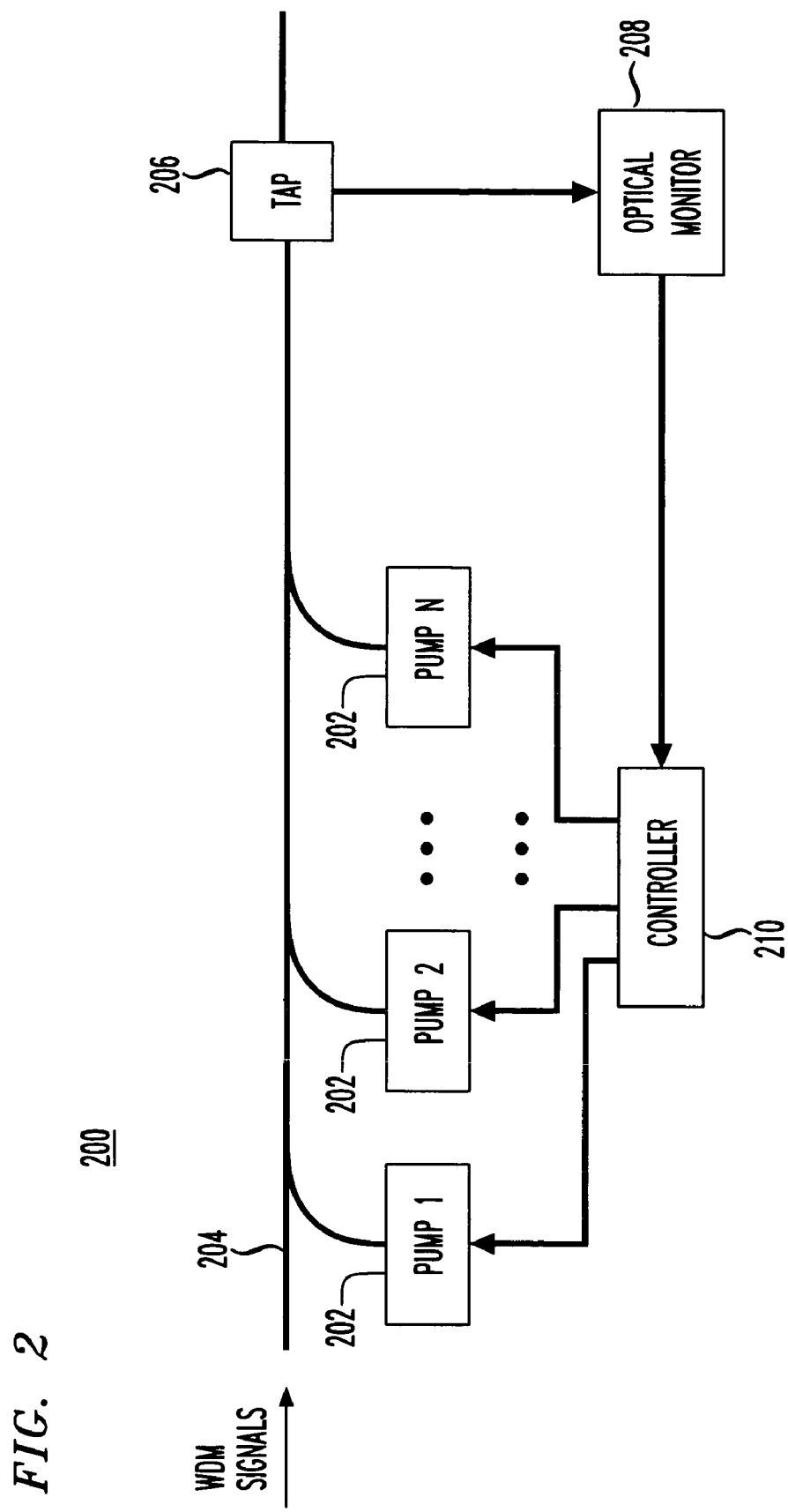
FIG. 2 shows a high-level block diagram of a forward-pumped Raman amplifier.

FIG. 2 shows a high-level block diagram of a forward-pumped Raman amplifier 200. Each of N Raman optical pumps 202 injects a different Raman pump signal into an optical fiber 204 that also carries one or more WDM signals propagating from left to right in FIG. 2. As the WDM signals and the N Raman pump signals propagate along optical fiber 204, power from the pump signals is transferred to the WDM signals.

Figure 3:
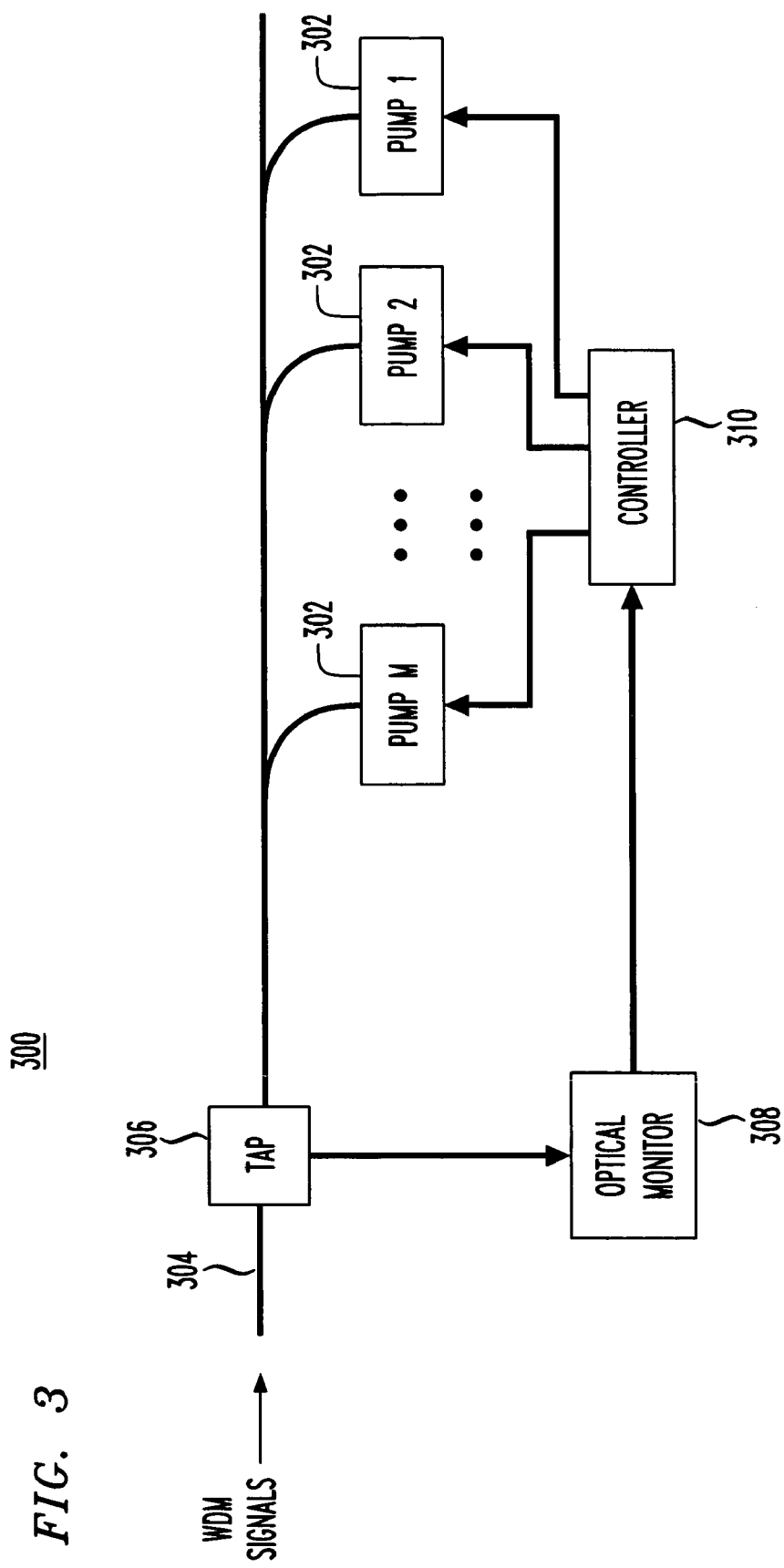
FIG. 3 shows a high-level block diagram of a backward-pumped Raman amplifier.

FIG. 3 shows a high-level block diagram of a backward-pumped Raman amplifier 300. Each of M Raman optical pumps 302 injects a different Raman pump signal into an optical fiber 304 that also carries one or more WDM signals propagating from left to right in FIG. 3. In amplifier 300, the pump signals are counter-propagating (i.e., from right to left in FIG. 3) As the WDM signals and the M Raman pump signals propagate in different directions within optical fiber 304, power from the pump signals is transferred to the WDM signals.

The block diagrams of FIGS. 2 and 3 are intended to illustrate transient control and are not intended to show all of the details of actual Raman amplifier implementations, which details would be known to those skilled in the art.

In one possible system implementation, each pair of elements that terminates a uni-directional optical fiber is implemented with a forward-pumped Raman amplifier at the upstream element and a backward-pumped Raman amplifier at the downstream element. For example, referring again to FIG. 1, for transmission of WDM signals from OADM 104 to repeater 112-2 over optical fiber 114-3, OADM 104 may have a forward-pumped Raman amplifier injecting Raman pump signals into the upstream end of optical fiber 114-3, while repeater 112-2 may have a backward-pumped Raman amplifier injecting Raman pump signals into the downstream end of optical fiber 114-3. In this case, both Raman amplifiers add power to the WDM channels transmitted from OADM 104 to repeater 112-2. In other possible implementations, a particular optical fiber may have only a single Raman amplifier (e.g., either a forward-pumped Raman amplifier at only the upstream element or a backward-pumped Raman amplifier at only the downstream element).

Referring again to FIG. 2, forward-pumped Raman amplifier 200 also has a tap 206, an optical monitor 208, and a controller 210. Tap 206 taps off a portion of the optical signal in optical fiber 204 for input to optical monitor 208, which generates measurements about the tapped optical signal for forwarding to controller 210, which uses those measurements to control the operations of the various Raman pumps 202. For example, for steady-state control, optical monitor generates a different power measurement at each of a number of different WDM frequencies (and possible one power measurement for each different WDM channel) to determine the individual pump levels for the N Raman pumps 202. Controller 210 can be implemented using any suitable software-and/or hardware-based processing elements.

Similarly, backward-pumped Raman amplifier 300 of FIG. 3 also has a tap 306, an optical monitor 308, and a controller 310. Tap 306 taps off a portion of the optical signal in optical fiber 304 for input to optical monitor 308, which generates measurements about the tapped optical signal for forwarding to controller 310, which uses those measurements to control the operations of the various Raman pumps 302. For example, for steady-state control, optical monitor generates a different power measurement at each of a number of different WDM frequencies (and possible one power measurement for each different WDM channel) to determine the individual pump levels for the M Raman pumps 302.

Figure 4:
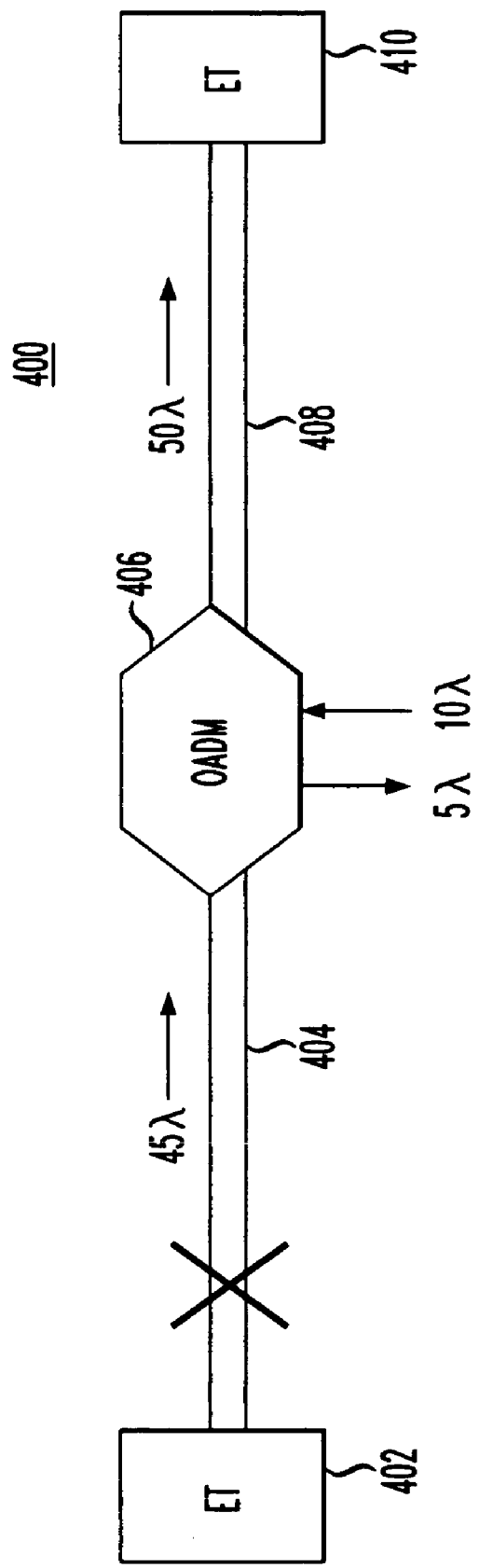
FIG. 4 shows a block diagram of an exemplary continuous-line optical communications system used to illustrate a network failure, in this case, a fiber cut, that can result in undesirable transient effects.

FIG. 4 shows a block diagram of an exemplary continuous-line optical communications system 400 used to illustrate a network failure, in this case, a fiber cut, that can result in undesirable transient effects. For purposes of this specification, a "continuous-line" system is an optical communications system having (exactly) two end terminals interconnected, via optical fibers, by a single serial configuration of one or more intermediate optical elements such as OADMs, repeaters, and the like. As such, continuous-line systems differ from systems have ring or mesh topologies.

For the exemplary continuous-line system 400, FIG. 4 shows end terminals (ET) 402 and 410 connected by first optical link 404, optical add/drop multiplexer (OADM) 406, and second optical link 408. Although not shown in FIG. 4, for WDM signals transmitted from left to right in FIG. 4, ET 402 may be implemented with a forward-pumped Raman amplifier at the upstream end of optical link 404, OADM 406 may be implemented with a backward-pumped Raman amplifier at the downstream end of optical link 404 and a forward-pumped Raman amplifier at the upstream end of optical link 408, and ET 410 may be implemented with a backward-pumped Raman amplifier at the downstream end of optical link 408.

Prior to the indicated failure of optical link 404, optical link 404 was populated with optical channels corresponding to 45 different WDM wavelengths, and optical link 408 with 50 wavelengths. As indicated in Table I, 40 of the 45 wavelengths on link 404 and 40 of the 50 wavelengths on link 408 were used for end-to-end traffic from ET 402 to ET 410. The remaining 5 wavelengths on link 404 were used for traffic from ET 402 dropped at OADM 406, while the remaining 10 wavelengths on link 408 were used for traffic added at OADM 406 for transmission to ET 410.

TABLE I

| | System Traffic (wavelengths) | | |
|---|---|---|---|
| | ET 402 | OADM 406 | ET 410 |
| ET 402 | | 5 | 40 |
| OADM 406 | 5 | | 10 |
| ET 410 | 40 | 10 | |

After the failure of link 404, the only surviving channels are the 10 wavelengths on link 408 added at OADM 406 for transmission to ET 410. (Note that, when each wavelength is used for bidirectional transmissions, there will still be 50 wavelengths transmitted from ET 410 over link 408, even though 40 of those 50 channels fail to reach their desired destination (i.e., ET 402) due to the fiber cut in link 404. As such, the failure of link 404 will not result in transient effects on the 10 wavelengths transmitted from ET 410 and dropped at OADM 406.)

Figure 5:
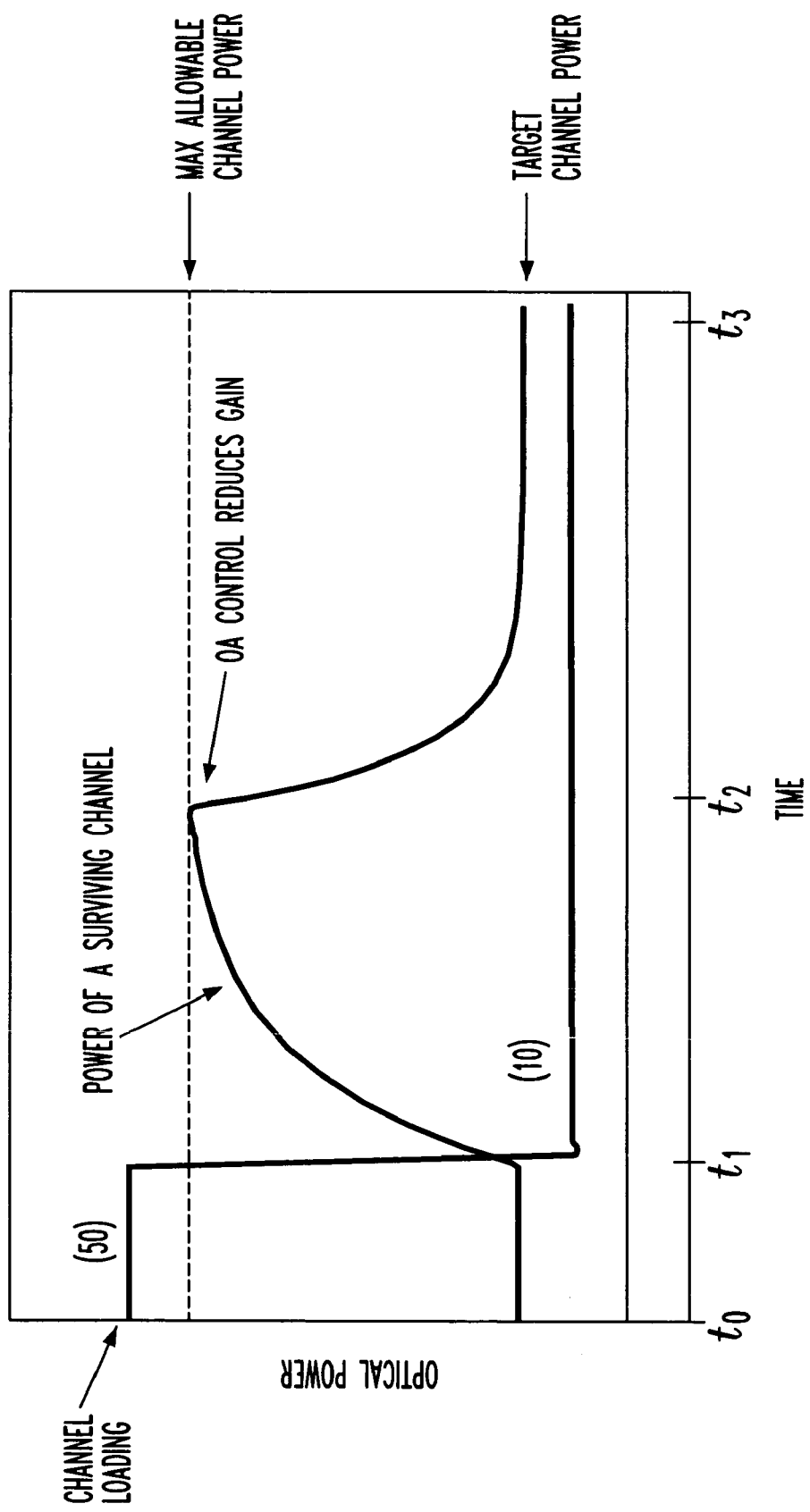
FIG. 5 graphically illustrates the existence and subsequent control of a possible channel transient following a network failure such as that depicted in FIG. 4.

FIG. 5 graphically illustrates the existence and subsequent control of a possible channel transient following a network failure such as that depicted in FIG. 4. For example, FIG. 5 may be said to depict the optical power in one of the 10 channels added at OADM 406 of FIG. 4 and transmitted over link 408 to ET 410 that survives the failure of link 404.

As illustrated in FIG. 5, prior to time $t_1$, link 408 is loaded with 50 channels, and each channel is being transmitted at its target optical power level. At time $t_1$, link 404 fails, and the loading of link 408 drops precipitously to ten channels. At the same time, the power in this particular surviving channel (as well as that in the other nine surviving channels, although not represented in FIG. 5) begins to rise as a result of the loss of the other 40 channels due to the characteristics of Raman amplification along link 408, where the power injected by the Raman pumps (still operating at their pre-failure levels) begins to transfer to fewer WDM channels (i.e., 10 instead of 50).

In this particular example, prior to the channel exceeding its maximum allowable power level, a transient-control algorithm detects a drop (resulting from the failure of link 404) in the total optical power in link 408 over the entire WDM channel band and begins to reduce the power levels of Raman pumps, thereby reducing the optical power in the illustrated channel, beginning at time $t_2$. By time $t_3$, the optical power in this channel has returned to its target level.

Although, in the example of FIG. 5, the channel never exceeds its "maximum" allowable power level, under certain system operating requirements, channel power may be allowed to exceed such a level for no more than a specified maximum amount of time. In that case, as long as the transient-control technique returns the channel's power level to below the "maximum" level within the specified duration, system operating requirements will be satisfied.

According to one possible transient-control technique for a system in which each optical link has a forward-pumped Raman amplifier at its upstream end and a backward-pumped Raman amplifier at its downstream end, the transient-control algorithm is implemented only at the backward-pumped Raman amplifiers. In this case and referring again to FIG. 3, one of the measurements (continuously) generated by optical monitor 308 is a measure of the total optical power level over the entire WDM channel band for the optical signals in optical fiber 304. Controller 310 uses this total optical power level to provide transient control in the event of network failures, such as a break in link 404 or in link 408.

In certain implementations, controller 310 initiates transient-control operations only when the decrease in total power (either relative or absolute, depending on the implementation) exceeds some specified threshold level. In other implementations, controller 310 is designed to apply transient control at all times, where relatively small changes in total power will result in relatively small transient-control adjustments to pump operations. In these latter implementations, the transient-control algorithm will react to "normal" changes in total power level, such as when an existing channel is de-provisioned, but those adjustments will be relatively small compared to the adjustments made in response to the relatively drastic changes in total power level that occur during fiber breaks affecting significant numbers of channels.

In either case, controller 310 generates control signals to control the power levels of pumps 302, where controller 310 can differently adjust the power level at which each different pump operates. In one embodiment, controller 310 is configured with a set of pump coefficients $m_i$, one for each different optical pump 302. When the total power level of the amplified output signal changes, the power level $P_i$ of the ith pump can be adjusted according to Equations (1) and (2) as follows:

$$P_i(\text{after}) = \gamma_i \cdot P_i(\text{before}) \quad (1)$$

$$\gamma_i = 1 - m_i \cdot \Delta P_{TOT} \quad (2)$$

where $\Delta P_{TOT}$ is the measured change in total optical power in units of dB.

Although transient control has been described in the context of controlling the transients that result when the number of channels drastically drops, e.g., due to a fiber cut, transient control can also be applied when the number of channels drastically increases, e.g., when services are restored after repairing a fiber cut. In this case, the measured change $\Delta P_{TOT}$ in total optical power would be a negative value, and Equations (1) and (2) could still be applied to appropriately increase, instead of decrease, the various pump power levels to minimize the transient effects.

The set of M pump coefficients $m_i$ for Raman amplifier 300 can be determined empirically or by simulation to optimize transient control for a number of different possible configurations of surviving channels. The detailed determination of the pump coefficients depends greatly upon the performance aspect of the system to be optimized. For example, the channel gain errors can be minimized for a uniformly distributed set of channels. In that case, to determine the pump coefficients, the target power is changed in fixed increments by removing channels from the system while retaining channels distributed evenly across the spectrum. For each of these configurations, the set of optical pump powers can be determined through standard steady-state determination methods. By plotting the change in target power against the change in pump power, the pump coefficients will correspond to the slopes of the corresponding curves. It is also possible to use a higher-order polynomial fit and thus a more complicated functional form to determine $\gamma_i$ compared to that of Equation (2). Another approach would be to measure and calculate these curves to generate a lookup table for pump adjustment values. Such an approach could be applied separately to individual Raman amplifiers or globally to a set of amplifiers with similar properties (e.g., pumps, fiber type, and losses).

In general, it is possible to choose any channel distribution in terms of both frequency and power and perform the optimization described here in order to determine the appropriate set of pump adjustment values for transient control. An example of another channel distribution in terms of frequency includes channels loaded sequentially from one end of the spectrum. Thus, as channels are removed, the remaining channels will not be uniformly distributed, but instead they would be located at the starting end of the spectrum. Examples of channel distributions in terms of power include all channels with equal power or channels with linearly increasing power as a function of the distance in frequency of the channels from one end of the spectrum.

Note that, for transient-control techniques in which transient control is implemented only at backward-pumped Raman amplifiers, the changes in the pump levels at a particular backward-pumped Raman amplifier need to compensate for the amplification resulting from the downstream backward-pumped Raman amplifier as well as the amplification resulting from the upstream forward-pumped Raman amplifier, if any. Note further that other techniques may implement transient control at both forward- and backward-pumped Raman amplifiers or only at forward-pumped Raman amplifiers.

Transient-Based Channel Growth

In addition to or as an alternative to implementing a transient-control algorithm that adjusts each pump power level differently for each optical pump in a Raman amplifier optimized to a channel configuration, a transient-based channel-growth plan can be implemented that controls the types of channel configurations that can exist following certain types of network failures, such as fiber cuts, either to reduce the transients that will result from such network failures or to optimize the effectiveness of whatever transient-control algorithm is implemented or both.

In general, for a WDM optical transmission system, the term "channel-growth plan" refers to the strategy used to update the system's existing channel configuration in response to a request for a change in service provided by the system. One type of service-change request is to select a global channel configuration for a newly provisioned optical transmission system. Another type is to select individual channel wavelengths as new service is provisioned in the system. Ideally, the channel configurations obtained for both these types would yield identical channel configurations; however, in practice, the provisioning of a new optical system can be much closer to the optimal channel configuration. Although not commonly practiced, a third type of service-change request is to reconfigure the channels after a change in the system such as the removal of channels or a degradation of the performance in certain system components.

Depending on the particular embodiment, a channel-growth plan may be implemented as a centralized function, e.g., at a system-level server, or as a distributed function, e.g., at different nodes throughout the system.

Typically, a channel-growth plan refers to the strategy used to select optical channels for new services that are provisioned in the system. Channel-growth plans can be implemented in a variety of different ways. One technique is to define a set of rules for channel assignment that are to be applied whenever new services are to be provisioned in the system. According to this technique, whenever a new set of service demands is received, the rules are applied to select channels for those demands, where the application of the rules takes into consideration the system's existing channel configuration.

According to another technique, the rules are applied in advance to generate a prioritized channel-assignment list that dictates the preferred sequence for assigning channels. In this case, channels are assigned for new service demands by referring to the pre-determined channel-assignment list to select available channels having the highest priorities.

Whether the rules are applied as the service demands are received (as in the former technique) or applied ahead of time to generate a pre-determined channel-assignment list (as in the latter technique), implementation of the channel-growth plan can be assisted by an automated (e.g., computer-based) tool that evaluates different possible channel-assignment options and identifies one or more options that satisfy the rules better than other options.

Conventional channel-growth plans include (1) lowest-cost channel-growth plans, which select wavelengths in a manner that defers the use of additional hardware resources until initial (e.g., minimal) hardware resources are fully utilized and (2) best-performance channel-growth plans, which select wavelengths in a manner that provides the best overall steady-state network performance (e.g., highest throughput, lowest error rates). A typical real-world implementation might strike a balance between these lowest-cost and best-performance goals to provide a relatively low-cost, relatively high-performance, hybrid channel-growth plan.

A transient-based channel-growth plan involves a third type of goal in the provisioning of optical channels: providing channel configurations such that the sets of surviving channels for the most likely network failures will enable the transients that result from such failures to be handled effectively. As before, a typical real-world implementation might strike a balance between different channel-growth goals to provide a hybrid channel-growth plan based on transient control and one or both of low cost and high performance.

A channel-growth plan involves two main components: a list of available frequencies and a list of service demands. The frequency list may be prioritized based upon the goals of the growth plan. For example, certain frequencies may be low-cost because they do not require particular components such as optical multiplexers or amplifiers. Certain frequencies may also provide better performance in the presence of a transient event depending on the particular transient-control algorithm implemented in a system. Thus, the frequencies may be classified or prioritized based upon the various criteria or rules in the growth plan. The service demands involve details of each channel to be assigned to a frequency, such as the transmission distance, bandwidth, and modulation format. These details will impose certain requirements on the channels in terms of both steady-state and transient performance. The demands can be prioritized or classified based upon these requirements. The growth plan provides the rules and methods for assigning channels from this demand list to the appropriate frequencies.

For certain optical transmission systems, in order to minimize the transients resulting from an event such as an upstream fiber cut, the total power gain for all of the WDM channels in a fiber before the event should equal the total power gain for the fiber's surviving WDM channels, where total power gain is defined as the ratio of the total optical power at the output of the fiber to the total optical power at the input of the fiber. For some system implementations, this goal might be advanced by assigning channels such that the surviving channels are uniformly distributed over the frequency range spanned by the channels prior to the transient event. Such a channel-growth plan will coordinate the assignment of channels that will not survive the transient event with the assignment of channels that will survive the transient event.

In some optical transmission systems, certain channel frequencies provide better transient control than others. In such systems, a transient-based growth plan might start by assigning the best-performing frequency, followed by assigning channels alternately on either side of the best performing frequency in a uniformly distributed manner.

Assume, For example, that optical transmission system 400 supports 100 different WDM channels (Ch1 to Ch100) spaced evenly in frequency (e.g., in 50-GHz increments) from Ch1 to Ch100. For optical link 408, channels used for signals from ET 402 to ET 410 are referred to herein as "end-to-end channels," while channels used for signals added at OADM 406 for transmission to ET 410 are referred to as "OADM channels." Assume further that only odd channels (i.e., Ch1, Ch3, . . . , Ch99) can be OADM channels, while any of the 100 channels can be end-to-end channels. Assume further still that Ch51 is the best-performing channel from a transient-control perspective, with transient-control performance falling off for channels farther away from Ch51, until Ch1 and Ch99, which are the worst-performing channels.

Assume further still that Ch51 is the best-performing channel from a transient-control perspective, with transient-control performance falling off for channels farther away from Ch51, until Ch1 and Ch99, which are the worst-performing channels.

In that case, a channel-growth plan might assign channels based on the following assignment orders:

Assignment order for OADM channels: Ch51, Ch49, Ch53, Ch47, Ch55, Ch45, Ch57, Ch43, Ch59, Ch41, Ch61, . . . , Ch99, Ch1.

Assignment order for end-to-end channels: Ch51, Ch50, Ch52, Ch49, Ch53, Ch48, Ch54, Ch47, Ch55, Ch46, Ch56, . . . , Ch100, Ch1.

For example, if the initial set of service demands for the system has four OADM channels and six end-to-end channels, a channel-growth plan that assigns OADM channels prior to end-to-end channels would assign channels in the order shown in Table II.

TABLE II

CHANNEL-ASSIGNMENT ORDER
(OADM CHANNELS FIRST)

| DEMAND | CHANNEL |
| --- | --- |
| 1st OADM channel | Ch51 |
| 2nd OADM channel | Ch49 |
| 3rd OADM channel | Ch53 |
| 4th OADM channel | Ch47 |
| 1st end-to-end channel | Ch50 |
| 2nd end-to-end channel | Ch52 |
| 3rd end-to-end channel | Ch48 |
| 4th end-to-end channel | Ch54 |
| 5th end-to-end channel | Ch55 |
| 6th end-to-end channel | Ch46 |

If, after provisioning this initial set of service demands, the next service demand were for an OADM channel, then, according to the previously defined channel-assignment order for OADM channels, the channel-growth plan would assign Ch45 as the highest-priority, available OADM channel. If, on the other hand, the next service demand were for an end-to-end channel, then, according to the previously defined channel-assignment order for end-to-end channels, the channel-growth plan would assign Ch56 as the highest-priority, available end-to-end channels.

Rearranging the channel-assignment order of Table II by channel number indicates the resulting channel configuration as shown in Table III.

TABLE III

CHANNEL CONFIGURATION

| CHANNEL(S) | DEMAND |
| --- | --- |
| Ch1-Ch45 | Available |
| Ch46 | 6th end-to-end channel |

TABLE III-continued

CHANNEL CONFIGURATION

| CHANNEL(S) | DEMAND |
| --- | --- |
| Ch47 | 4th OADM channel |
| Ch48 | 3rd end-to-end channel |
| Ch49 | 2nd OADM channel |
| Ch50 | 1st end-to-end channel |
| Ch51 | 1st OADM channel |
| Ch52 | 2nd end-to-end channel |
| Ch53 | 3rd OADM channel |
| Ch54 | 4th end-to-end channel |
| Ch55 | 5th end-to-end channel |
| Ch56-Ch100 | Available |

Given the channel configuration of Table III, if optical fiber 404 of FIG. 4 were cut, then the surviving channels would be the four OADM signals on Ch47, Ch49, Ch51, and Ch53. As can be seen in Table III, this set of surviving channels is substantially uniformly distributed over the frequency range spanned by the channels prior to the transient event (i.e., the "pre-transient frequency range" corresponding to the ten channels from Ch46 to Ch55).

This example demonstrates that the general principle that sets of surviving channels can be uniformly distributed over the pre-transient frequency range (i.e., Ch46 to Ch55, in this example) without having to be maximally separated over the entire available range of frequencies (i.e., Ch1 to Ch100, in this example). Note, however, that, when the pre-transient frequency range does span the available frequency range, uniform distribution does suggest maximal separation over that range.

Although, in this particular example, ten consecutive channels (i.e., Ch46 to Ch55) are assigned for the set of ten service demands, uniform distribution can also be achieved by assigning non-consecutive channels, where the resulting channel configuration spans a frequency range having one or more unassigned channels distributed among the ten assigned channels.

So far, the discussion of exemplary transient-based channel-growth plans has not considered any criteria other than the control of transients. As suggested previously, real-world implementations of growth plans will also take cost and steady-state performance into consideration. A particular implementation may divide the available channels into different sets.

For example, the available channels may be divided into a start-up set and one or more growth sets, where each growth set requires more hardware than the previous set. Consider, for example, an exemplary 200-channel WDM system, where Ch1 to Ch100 can be handled with a particular hardware configuration, but where Ch101 to Ch200 require the use of additional Raman pumps. In that case, for cost considerations, the growth plan may divide the 200 channels into a start-up set corresponding to Ch1 to Ch100 and a growth set corresponding to Ch101 to Ch200, where channels are preferably assigned from the start-up set before assigning channels from the growth set.

In addition, the available channels may be divided into different frequency groups, where each frequency group corresponds to those channels that are handled by a particular tunable optical translator (OT). For example, the 200 channels may be divided into ten different frequency groups, where Frequency Group 1 (FG1) corresponds to Ch1 to Ch20, FG2 corresponds to Ch21 to Ch40, FG3 corresponds to Ch41 to Ch60, and so on to FG10, which corresponds to Ch181 to Ch200. For performance reasons, it may be preferable to rotate between the different frequency groups when assigning channels.

In addition, the available channels may be divided into different offset types. For example, in one possible system hardware implementation, Ch1, Ch5, Ch9, . . . , Ch197 are referred to as the 0-GHz offset channels, Ch2, Ch6, Ch10, . . . , Ch198 are referred to as the 50-GHz offset channels, Ch3, Ch7, Ch11, . . . , Ch199 are referred to as the 100-GHz offset channels, and Ch4, Ch8, Ch12, . . . , CH200 are referred to as the 150-GHz offset channels, where, for example, Ch2 is offset 50 GHz from Ch1, Ch3 is offset 100 GHz from Ch1, and Ch4 is offset 150 GHz from Ch1. These terms refer to the fact that, in this system hardware implementation, (i) the 50-GHz offset channels involve the additional use of 50-GHz offset optical multiplexers (OMs) and optical demultiplexers (ODs), (ii) the 100-GHz offset channels involve the additional use of 100-GHz offset OMs/ODs, and (iii) the 150-GHz offset channels involve the additional use of 150-GHz offset OMs/ODs. As such, for cost and/or performance considerations, it may be preferable to provision all 0-GHz offset channels, then all 100-GHz offset channels, then all 50-GHz offset channels, and lastly all 150-GHz offset channels.

As described in the previous 100-channel example, for transient performance considerations, if the system is a continuous-line system (as opposed, e.g., to a ring system or a mesh system), it may be preferable to have the OADM channels (i.e., channels that add/drop on at least one OADM or ROADM) in each optical fiber distributed uniformly over the frequency range of all provisioned channels on that fiber. To support this goal, an exemplary channel-growth plan might enable only every other channel (e.g., the odd channels) to be added and/or dropped at OADMs, while all channels (e.g., the even channels and any unused odd channels) can be used for end-to-end channels (i.e., channels used for services from one end of the continuous-line system to the other end).

Based on these low-cost and high-performance goals, an exemplary hybrid channel-growth plan might reserve the 50 odd channels in the 100-channel start-up set for OADM service, while any of the 100 start-up channels can be used for end-to-end service. Similarly, the 50 odd channels in the growth set are reserved for OADM service, while any of the 100 growth channels can be used for end-to-end service.

Note that, due to these restrictions and depending on the current channel configuration, the exemplary channel-growth plan might select a channel from the first growth set before all of the 100 start-up channels are provisioned. For example, when only 99 of the 100 start-up channels are currently allocated to 50 OADM services and 49 end-to-end services, if another OADM service is to be provisioned, then the channel will be selected from the growth set, even though another start-up channel is not yet allocated, because that unused start-up channel is an even channel that cannot be used for OADM service.

As described previously, for certain exemplary systems, to achieve optimal system performance during transient conditions, the post-transient (after fiber break, etc.) surviving channels should (ideally) be uniformly distributed across the pre-transient frequency range. For example, the distribution of currently provisioned OADM channels (i.e., the only channels surviving a fiber cut upstream of the OADM) are preferably separated by equal frequency segments. In a line system containing several OADMs, it may be difficult for all potential surviving sets to be evenly distributed (for example, consider the case of a single surviving channel).

This helps to emphasize the fact that the demand requirements should also be considered. An isolated demand between particular ingress and egress points should be assigned to a high-performance frequency in order to ensure a stable transient response.

For purposes of this specification, a "unique network path" starts on terminal A (i.e., any End Terminal (ET) or OADM), ends on terminal B (i.e., another ET or OADM), and has one or more wavelengths that originate on A and terminate on B (and/or vice versa). The availability of multiple OADMs with unrestricted numbers of add and drop channels in a typical line system means several "unique network paths" may share lengths of fiber. This means that the possible sets of surviving channels couple the transient response of different "unique network paths," giving the selection of channels for transient mitigation a non-local nature. This non-local nature can be handled by an automated tool that searches over all potential channel configurations or approximate rules that can be used to add one channel at a time to the system. The following four channel-growth rules (listed in order of priority) may be applied to balance the three goals of low cost, high performance, and transient control when selecting channels for unique network paths:

Rule 1: Whenever possible, select channels from the start-up set prior to the growth set.

Rule 2: Whenever possible, select channels by rotating between different frequency groups.

Rule 3: Whenever possible, select channels of the same offset type before selecting channels of another offset type.

Rule 4: Whenever possible, select OADM channels to minimize channel transient effects such as can occur in channels that survive an upstream fiber failure.

Depending on the characteristics of the particular system, Rule 4 may be implemented in a number of different ways, including one or more of the following:

Rule 4a: Whenever possible, select OADM channels to keep post-transient surviving channel total power gain equal to the pre-transient total power gain.

Rule 4b: Whenever possible, select OADM channels such that the post-transient surviving channels are distributed uniformly over the pre-transient channel frequency range.

Rule 4c: Whenever possible, select OADM channels such that the average power of the post-transient surviving channels is substantially equal to the average power of the pre-transient channels.

Rule 4d: Whenever possible, select OADM channels such that the average power of the post-transient surviving channels is substantially equal to the power level of a specified channel.

Rule 4b may be suitable for a system that implements the transient-control technique described in the previous section. Rule 4c may be suitable when the WDM channel spectrum does not have a uniform power level. Rule 4d may be suitable when the power level of the WDM channel spectrum varies in a predictable manner, such as a uniform spectrum or a tilted spectrum where the power level increases or decreases with increasing channel number. Other versions of Rule 4 are also possible and will depend on the particular characteristics of the system and any transient-control technique that may be implemented.

The above list of rules can be used to generate a prioritized frequency list. Such a list will represent an approximation to the ideal channel allocation. Once this list is generated, the list of demands can be organized to optimize the channel assignments. Upon completion of channel assignment based upon the growth-plan rules, a goodness metric can be applied to the resulting configurations to signal whether adjustments need to be made or simply to provide warnings or other performance indicators. While the goodness metric cannot be improved for a channel assignment that ideally satisfies the channel-growth plan, such a channel assignment will rarely occur as a result of using an approximate set of selection rules.

FIG. 6 shows a flow diagram of the processing implemented to select a channel for the next provisioned service in the exemplary transmission system of FIG. 4. For example, this processing may be applied for the provisioning of (i) end-to-end channels between ET 402 and ET 410 as well as (ii) OADM channels between ET 402 and OADM 406 and (iii) OADM channels between OADM 406 and ET 410. Note that, while the provisioning of an end-to-end channel allocates that channel for both links 404 and 408, the provisioning of an OADM channel allocates that channel to only one link. As such, that same wavelength may still be available for provisioning of another OADM channel on the other link. In general, implementing channel-growth plans involves bookkeeping for each different link in an optical transmission system in order to take advantage of the efficiencies of wavelength re-use within the system.

Step 602 determines whether the service to be provisioned requires an OADM channel or an end-to-end channel. If an OADM channel is required, then an available OADM channel is selected for the new OADM service (step 604). This may involve selecting the available OADM channel having the lowest selection number in a pre-determined, prioritized, OADM channel-assignment list. Alternatively, the selection may involve applying the rules of the channel-growth plan to select an available OADM channel, taking into consideration the existing channel configuration.

On the other hand, if an end-to-end channel is required, then an available channel is selected for the new end-to-end service (step 606). Here, too, this selection may involve reference to a pre-determined end-to-end channel-assignment list or application of the rules to the existing channel configuration.

Note that, since individual services can be de-provisioned from the system, there may, at any given time, be "holes" in the current allocation of channels, where one or more available channels have channel-selection order numbers that are lower than those of other currently provisioned channels. As such, the processing of FIG. 6 preferably looks for the available OADM or end-to-end channel having the lowest channel-selection order number, rather than simply selecting the next channel after the currently provisioned channel having the highest channel-selection order number.

Applying the four rules to the exemplary 200-channel, continuous-line optical transmission system may yield the channel-assignment list of Table IV (see FIGS. 7A-E). As shown in Table IV, OADM channels are assigned in accordance with an OADM-channel order that starts with Ch41, then Ch61, then Ch21, then Ch81, then Ch1, and so on. Similarly, end-to-end channels are assigned in accordance with an end-to-end channel order that starts with Ch53, then Ch73, then Ch23, then Ch93, then Ch13, and so on.

Notice that the first 50 OADM channels and the first 100 end-to-end channels all fall within the start-up channel set, while the second 50 OADM channels and the second 100 end-to-end channels all fall within the growth channel set, thereby satisfying Rule 1.

Notice further that, within the start-up set, the OADM and end-to-end channel-assignment orders both follow a frequency-group rotation of FG3, then FG4, then FG2, the FG5, then FG1. Similarly, within the growth set, the OADM and end-to-end channel-assignment orders both follow a frequency-group rotation of FG6, then FG7, then FG8, then FG9, then FG10. This indicates that, given the constraints of the higher-priority Rule 1, Rule 2 is also satisfied.

Notice further still that, within the start-up set, for OADM channels, all 0-GHz offset channels are assigned, then all 100-GHz offset channels, while, for end-to-end channels, all 0-GHz offset channels are assigned, then all 100-GHz offset channels, then all 50-GHz offset channels, and lastly all 150-GHz offset channels, and similarly within the growth set. This indicated that, given the constraints of the higher-priority Rule 1, Rule 3 is also satisfied.

In a typical real-world optical transmission system, no single channel-assignment list can provide optimal transient performance for each possible channel configuration. Nevertheless, the channel-assignment list of Table IV is designed to optimize transient performance over a relatively wide range of different channel configurations.

For example, if 50 OADM channels are provisioned followed by 50 end-to-end channels, then the resulting channel configuration will have the first 50 odd channels assigned to as OADM channels and the first 50 even channels assigned to end-to-end channels, thereby providing a channel configuration in which the surviving channels (i.e., the 50 OADM channels) are distributed uniformly over the pre-transient frequency range (i.e., the first 100 channels).

Similarly, if 100 OADM channels are provisioned followed by 100 end-to-end channels (corresponding to a maximally loaded fiber), then the resulting channel configuration will have the 100 odd channels assigned to as OADM channels and the 100 even channels assigned to end-to-end channels, thereby providing another channel configuration in which the surviving channels (i.e., the 100 OADM channels) are distributed uniformly over the pre-transient frequency range (i.e., the full 200-channel band).

As another example, Table V (see FIGS. 8A-C) shows the channel configuration resulting from provisioning 10 OADM channels followed by 10 end-to-end channels using the channel-assignment list of Table IV. (Note that, since Ch121 to Ch200 are not assigned in this example, they are omitted from Table V.) Although the 10 OADM channels might not necessarily be distributed perfectly uniformly over the 20-channel pre-transient frequency range, they are nevertheless substantially uniformly distributed over that range.

It should be understood that the channel selection obtained from applying these rules depends strongly on the nature of the underlying network topology as well as the number of channels allocated. As the underlying topology changes, the possible sets of surviving channels change. This arises because multiple unique network paths can share both amplifiers and fiber links. Since we refer to the nature (e.g., total power gain or distribution) of the surviving-channel sets within the rules, different networks will typically exhibit different channel-allocation patterns. The number of channels in the network also changes the resultant channel-allocation pattern. For example, in the case of finding evenly distributed channels, a substantially evenly distributed four-channel system (e.g., Ch1, Ch34, Ch67, and Ch100) might have only two channels in common with a substantially evenly distributed five-channel system (e.g., Ch1, Ch25, Ch50, Ch75, and Ch100). For adding a single channel to a pre-existing immutable transmission system, the addition of the new channel can still be selected to adhere whenever possible to the above set of rules; however, the resultant channel distribution may differ from the distribution obtained by re-optimizing the location of all channels.

These dependencies mean that it is not generally possible to produce a unique listing of channel locations that will be optimized for all contingencies. Rather, rules such as those defined above will generally approach the optimal final channel configuration, but will rarely obtain the global optimum. To obtain the global optimum, an automated optimization tool can be used to search all possible channel configurations to balance the goals of the growth plan. Ideally, such a tool can tailor the importance of cost, performance, and transient stability to match the needs of a specific network. It is also important for such a tool to estimate potential future growth for a network enabling future channels to be added to the network without dramatically reducing the transient stability or network performance characteristics.

When a set of new demands is required on a system, and these demands traverse more than one unique path (as particularly might be the case for a new system), then the set of demands can be organized in order to optimize the selection of channels for those demands. Certain demands that have long-distance requirements or that share a common path with very few channels, are preferably provisioned on the frequencies with the best performance with regard to transients. If the channels are blindly assigned, then all of the best-performing frequencies might be taken before these demands with special needs are assigned. Thus, the list of demands should be prioritized.

In general, there is concern about the performance of the different possible surviving channels sets. Thus, as a first step, the demands that share a common unique path can be grouped together or the demands that share a common link can be grouped together. For the first case, the groups are mutually exclusive, but the second case typically results in overlapping groups. The demands within each group can be further prioritized based upon various criteria such as transmission distance or modulation bandwidth or even quality-of-service parameters, for example, associated with leased channels. Finally, the various groups can be prioritized based upon their characteristics such as transmission distance if all the demands share a unique path. Longer-distance channels are given a higher priority.

Channel assignment can be carried out either by moving down the priority list on demands one by one or by cycling through the various demand groups. Cycling through the channel groups, choosing one channel from each group, has the advantage that no group will end up with all of its channels in poor-performing configurations. Also, single- or few-demand groups will be assigned good frequencies before the larger groups are fully assigned. This takes advantage of the fact that transient control is more difficult if the size of the channel population change is large, which can occur if the surviving-channel set is small. Larger channel groups can tolerate worse channel assignments because the size of the transient will typically be smaller and there is a collective benefit of having more channels.

Note that the exemplary channel-assignment list of Table IV is based on the assumption of a continuous-line transmission system having a single OADM located between two end terminals. The channel-assignment list may change if there are more than one OADM and/or for non-continuous-line transmission systems, such as ring networks and mesh networks. The primary change results from the increased potential for unique network paths to share amplifiers and fiber links. This increased overlap dramatically increases the number of sets of unique post-transient surviving-channel sets. The number of sets makes the optimization process for determining the optimal channel configuration more time consuming, but the basic methodology for selecting the optimal set remains the same as the continuous-line system.

As suggested earlier, an automated tool can be designed to evaluate the acceptability of different possible channel configurations in order to select channels for provisioning new services. Such an automated tool may take one or more of the following into consideration when generating a goodness parameter used to evaluate each different configuration considered:

- Each set of one or more channels following a unique network path is identified. Channel sets are prioritized based on a goal of controlling transients that result from the one or more possible future failures. The channels are assigned to frequencies based upon this prioritized list.
- Channel assignment selects the first channel from the highest-priority set and assigns it to the frequency that corresponds to the best performance in the event of a transient that results from the one or more possible future failures. Next, the first channel from the second-highest-priority set is assigned to the next available frequency with highest transient performance. The process continues by rotating among all of the channel sets to assign the first channel from each set and then again rotating through all of the channel sets to assign the second channel, etc., until all channels are assigned.
- The frequencies are chosen based upon a set of growth plan rules (and not just based upon the best transient performance).
- The frequencies are chosen based upon a pre-determined channel selection table.
- The goodness parameter is used to estimate the performance of a set of channels in response to a transient. This goodness parameter is calculated for each channel set that has been assigned.
- A set of criteria are applied to the goodness parameter, and the channel layout is adjusted based upon whether the goodness parameter falls within a certain range.
- The goodness parameter is based upon the average power of the surviving channel set. For the case in which the transient optimization is based upon matching the average power of the surviving channel sets to the power of a particular channel, the goodness parameter can be a linear function of this requirement. For example, the goodness parameter can be equal to (Pavg-Pref), where Pavg is the average power of the surviving channel set and Pref is the power of the target reference channel. Other functions can be used depending on the transient control and transmission system characteristics.

Those skilled in the art will recognize that other factors may be used to construct a goodness parameter including one or more of the following factors:

- The goodness parameter is based upon the transmission distance of the surviving channel set.
- The goodness parameter is based upon the number and/or type of network elements that the channel set traverses.
- The goodness parameter is based upon the power distribution of other channel sets that share portions of the path of the surviving channel set.
- The goodness parameter is based on all of the channels in each link.
- The channel sets are chosen by using all of the channels in each link (between two add/drop points).

ALTERNATIVE EMBODIMENTS

Although the described transient-control techniques rely on a total power measurement corresponding to the entire WDM spectrum, transient control could also be implemented using two or more discrete, spectrally banded detectors, where the in-band power measured by at least one detector is used to differently adjust the power levels of two or more Raman optical pumps, e.g., using different power ratios. For example, in a system having start-up and growth sets of channels, where start-up channels are assigned before growth channels, two banded detectors—one measuring the total in-band power for the start-up channels and one measuring the total in-band power for the growth channels—could be used to implement transient control, where the Raman pump levels are differently adjusted based upon the two in-band power measurements. This alternative transient-control technique could, in turn, affect the channel-growth plan for that system.

Although transient control has been described in the context of controlling transients due to Raman optical amplifiers, transient control can also be implemented in other contexts, such as controlling transients due to erbium-doped fiber amplifiers or semiconductor optical amplifiers. In addition, instead of adjusting pump powers, transient control could be implemented by controlling wavelength-dependent optical attenuators or other control devices that act directly on the channels.

The invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing steps in a software program. Such software may be employed in, for example, a digital signal processor, microcontroller, or general-purpose computer.

The invention can be embodied in the form of methods and apparatuses for practicing those methods. The invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

We claim:

1. A method for operating an optical transmission system having a link capable of carrying a plurality of optical channels of different wavelengths traveling along the link in a downstream direction, the method comprising:

tapping, at an initial time, an initial optical signal from the link using an optical tap connected to the link;

measuring, using an optical monitor, an initial total optical power level for the tapped initial optical signal for wavelengths corresponding to at least two of the optical channels;

tapping, at a subsequent time after the initial time, a subsequent optical signal from the link using the optical tap;

measuring, using the optical monitor, a subsequent total optical power level for the tapped subsequent optical signal for the wavelengths corresponding to the at least two optical channels using the optical monitor;

measuring a change in total optical power level for the wavelengths corresponding to the at least two optical channels by comparing the measured initial total optical power level and the measured subsequent total optical power level; and adjusting pump power levels of a plurality of optical pumps in the optical transmission system, wherein:

the plurality of optical pumps are connected in series along the link to inject optical signals into the link in a single direction;

if the optical pumps inject optical signals in the downstream direction, then the optical tap is connected downstream of the plurality of optical pumps;

if the optical pumps inject optical signals in an upstream direction, then the optical tap is connected upstream of the plurality of optical pumps;

adjusting the pump power level of a first of the optical pumps affects a first set of the optical channels;

adjusting the pump power level of a second of the optical pumps affects a second set of the optical channels having a different set of wavelengths from the first set of the optical channels;

the adjustment for each optical pump is a function of (i) the measured change in the total optical power level and (ii) a specified transient-control model for the optical pump; and two or more of the optical pumps have different specified transient-control models such that different adjustments are made to the pump power levels of the two or more optical pumps based on the measured change in the total optical power.

2. The invention of claim 1, wherein the specified transient-control model for each optical pump comprises a linear term based on a specified linear coefficient.

3. The invention of claim 1, wherein the specified transient-control model for each optical pump is implemented using a lookup table.

4. The invention of claim 1, wherein:

the measured initial total optical power level corresponds to total optical power for wavelengths corresponding to all of the optical channels at the initial time;

the measured subsequent total optical power level corresponds to total optical power for wavelengths corresponding to all of the optical channels at the subsequent time; and the measured change in the total optical power level corresponds to total optical power for wavelengths corresponding to all of the optical channels.

5. The invention of claim 1, wherein the plurality of optical pumps are different optical pumps of an optical amplifier in the optical transmission system.

6. The invention of claim 1, wherein the measured change in the total optical power level corresponds to a sudden change in the number of channels on the link.

7. The invention of claim 1, wherein the model takes into account transient performance of the optical transmission system following one or more possible future failures in the optical transmission system.

8. The invention of claim 1, wherein the measured change in the total optical power level is generated without applying any spectral filtering to the tapped initial and subsequent optical signals.

9. The invention of claim 1, wherein the pump power levels of the plurality of optical pumps are adjusted without applying any spectral filtering to any optical signals used in adjusting the pump power levels.

10. The invention of claim 1, wherein the adjustment for each optical pump is a function of the same measured change in the total optical power level.

11. The invention of claim 1, wherein the adjustment of each optical pump affects a different set of the optical channels of different wavelengths.

12. The invention of claim 2, wherein the specified transient-control model for each optical pump further comprises one or more higher-order terms, each higher-order term based on a specified higher-order coefficient.

13. The invention of claim 5, wherein the optical amplifier is part of an optical add/drop multiplexer (OADM) in the optical transmission system.

14. The invention of claim 5, wherein:

the change in pump power level for each optical pump is a function of (i) the measured change in the total optical power level and (ii) a specified coefficient for the optical pump; and at least two optical pumps have different specified coefficients.

15. The invention of claim 6, wherein the sudden change in the number of channels on the link results from a break in an optical fiber in the optical transmission system.

16. The invention of claim 14, wherein the specified coefficients for the optical pumps are selected to optimize transient response for a variety of different channel configurations, each channel configuration having a different set of wavelengths.

17. The invention of claim 14, wherein the change in the pump power level for optical pump i is based on:

$$P_i(\text{after}) = \gamma_i \cdot P_i(\text{before}),$$

wherein:

$P_i(\text{before})$ is the pump power level of optical pump i before the change in the pump power level;

$P_i(\text{after})$ is the pump power level of optical pump i after the change in the pump power level; and $\gamma_i = 1 - m_i \cdot \Delta P_{TOT}$, wherein:

$\Delta P_{TOT}$ is the measured change in the total optical power; and $m_i$ is the specified coefficient for optical pump i.

18. The invention of claim 16, wherein the specified coefficients for the optical pumps correspond to a slope of a linear curve fit of different optimized coefficients, each optimized coefficient corresponding to an optimized pump power level adjustment for a particular channel configuration.

19. The invention of claim 17, wherein the measured change in the total optical power is in units of dB.

20. An apparatus for operating an optical transmission system having a link capable of carrying a plurality of optical channels of different wavelengths traveling along the link in a downstream direction, the apparatus comprising:

tap means connected to the link for tapping an initial optical signal from the link at an initial time and for tapping a subsequent optical signal from the link at a subsequent time after the initial time;

an optical monitor for measuring an initial total optical power level for the tapped initial optical signal for wavelengths corresponding to at least two of the optical channels and for measuring a subsequent total optical power level for the tapped subsequent optical signal for the wavelengths corresponding to the at least two optical channels;

means for measuring a change in total optical power level for the wavelengths corresponding to the at least two optical channels by comparing the measured initial total optical power level and the measured subsequent total optical power level; and means for adjusting pump power levels of a plurality of optical pumps in the optical transmission system, wherein:

the plurality of optical pumps are connected in series along the link to inject optical signals into the link in a single direction;

if the optical pumps inject optical signals in the downstream direction, then the optical tap is connected downstream of the plurality of optical pumps;

if the optical pumps inject optical signals in an upstream direction, then the optical tap is connected upstream of the plurality of optical pumps;

adjusting the pump power level of a first of the optical pumps affects a first set of the optical channels;

adjusting the pump power level of a second of the optical pumps affects a second set of the optical channels having a different set of wavelengths from the first set of the optical channels;

the adjustment for each optical pump is a function of (i) the measured change in the total optical power level and (ii) a specified transient-control model for the optical pump; and two or more of the optical pumps have different specified transient-control models such that the adjusting means is adapted to make different adjustments to the pump power levels of the two or more optical pumps based on the measured change in the total optical power.

21. An apparatus for operating an optical transmission system having a link capable of carrying a plurality of optical channels of different wavelengths traveling along the link in a downstream direction, the apparatus comprising:

an optical tap connected to the link and adapted to tap an initial optical signal from the link at an initial time and a subsequent optical signal from the link at a subsequent time after the initial time;

an optical monitor adapted to measure (1) an initial total optical power level for the tapped initial optical signal for wavelengths corresponding to at least two of the optical channels and (2) a subsequent total optical power level for the tapped subsequent optical signal for the wavelengths corresponding to the at least two optical channels; and a controller adapted to measure (1) a change in total optical power level for the wavelengths corresponding to the at least two optical channels by comparing the measured initial total optical power level and the measured subsequent total optical power level and (2) adjust pump power levels of a plurality of optical pumps in the optical transmission system, wherein:

the plurality of optical pumps are connected in series along the link to inject optical signals into the link in a single direction;

if the optical pumps inject optical signals in the downstream direction, then the optical tap is connected downstream of the plurality of optical pumps;

if the optical pumps inject optical signals in an upstream direction, then the optical tap is connected upstream of the plurality of optical pumps;

adjusting the pump power level of a first of the optical pumps affects a first set of the optical channels;

adjusting the pump power level of a second of the optical pumps affects a second set of the optical channels having a different set of wavelengths from the first set of the optical channels;

the adjustment for each optical pump is a function of (i) the measured change in the total optical power level and (ii) a specified transient-control model for the optical pump; and two or more of the optical pumps have different specified transient-control models such that the controller is adapted to make different adjustments to the pump power levels of the two or more optical pumps based on the measured change in the total optical power level.

22. The invention of claim 21, wherein the specified transient-control model for each optical pump comprises a linear term based on a specified linear coefficient.

23. The invention of claim 21, wherein the plurality of optical pumps are different optical pumps of an optical amplifier in the optical transmission system.

24. The invention of claim 21, wherein the apparatus further comprises the plurality of optical pumps.

25. The invention of claim 21, wherein the model takes into account transient performance of the optical transmission system following one or more possible future failures in the optical transmission system.

26. The invention of claim 21, wherein the optical monitor is adapted to generate the measured change in the total optical power level without applying any spectral filtering to the tapped initial and subsequent optical signals.

27. The invention of claim 21, wherein the controller is adapted to adjust the pump power levels of the plurality of optical pumps without any spectral filtering being applied to any optical signals used in adjusting the optical pumps.

28. The invention of claim 23, wherein:
the change in pump power level for each optical pump is a function of (i) the measured change in the total optical power level and (ii) a specified coefficient for the optical pump; and
at least two optical pumps have different specified coefficients.

29. The invention of claim 24, wherein the apparatus is an optical amplifier for the optical transmission system.

30. The invention of claim 24, wherein the apparatus is an OADM for the optical transmission system.

31. The invention of claim 24, wherein the apparatus is a node for the optical transmission system.

32. The invention of claim 24, wherein the apparatus is the optical transmission system.

33. The invention of claim 28, wherein the specified coefficients for the optical pumps are selected to optimize transient response for a variety of different channel configurations, each channel configuration having a different set of wavelengths.

34. The invention of claim 28, wherein the controller is adapted to base the change in the pump power level for optical pump i on:

$$P_i(\text{after}) = \gamma_i \cdot P_i(\text{before}),$$

wherein:
$P_i(\text{before})$ is the pump power level of optical pump i before the change in the pump power level;
$P_i(\text{after})$ is the pump power level of optical pump i after the change in the pump power level; and
$\gamma_i = 1 - m_i \cdot \Delta P_{TOT}$, wherein:
$\Delta P_{TOT}$ is the measured change in the total optical power; and
$m_i$ is the specified coefficient for optical pump i.

35. The invention of claim 34, wherein the measured change in the total optical power is in units of dB.

* * * * *